US006816331B2

(12) United States Patent  
Porter et al.

(10) Patent No.: US 6,816,331 B2
(45) Date of Patent: Nov. 9, 2004

(54) TAPE CARTRIDGE PICKER FOR AN AUTOMATED TAPE CARTRIDGE AUTOLOADER/LIBRARY SYSTEM

(75) Inventors: Ryan Stuart Porter, Monument, CO (US); John C. Owens, Arvada, CO (US); Paddy Eliot Collins, Colorado Springs, CO (US); Scott Ryan Patterson, Manitou Springs, CO (US); Kim M. Thomas, Black Forest, CO (US)

(73) Assignee: Quantum Corporation, San Jose, CA (US)

( * ) Notice: Subject to any disclaimer, the term of this patent is extended or adjusted under 35 U.S.C. 154(b) by 545 days.

(21) Appl. No.: 09/860,773

(22) Filed: May 17, 2001

(65) Prior Publication Data

US 2002/0057513 A1 May 16, 2002

Related U.S. Application Data

(63) Continuation-in-part of application No. 09/710,645, filed on Nov. 10, 2000.

(51) Int. Cl.[7] .............................................. G11B 19/02
(52) U.S. Cl. ........................................ 360/69; 360/92
(58) Field of Search .............................. 360/69, 71, 92; 369/30.31, 30.32, 30.43, 30.57, 192, 178.01; 414/280, 277, 225

(56) References Cited

U.S. PATENT DOCUMENTS

| | | | |
|---|---|---|---|
| 4,063,294 A | 12/1977 | Burkhart ...................... 360/92 |
| 4,635,150 A | 1/1987 | Kato et al. ................ 360/98.06 |
| 4,878,137 A | 10/1989 | Yamashita et al. ........ 360/48.05 |
| 4,910,619 A | 3/1990 | Suzuki et al. .................. 360/92 |
| 4,981,409 A | 1/1991 | Hirose et al. ................ 414/225 |
| 5,089,920 A | 2/1992 | Bryer et al. ................... 360/92 |
| 5,196,972 A | 3/1993 | Matsumaru et al. .......... 360/94 |
| 5,293,284 A | 3/1994 | Sato et al. .................... 360/92 |
| 5,402,285 A | 3/1995 | Theobald, Jr. et al. ........ 360/69 |

(List continued on next page.)

FOREIGN PATENT DOCUMENTS

| | | |
|---|---|---|
| DE | 37 21821 C1 | 10/1988 |
| EP | WO 89/08311 | 1/1989 |
| EP | 0 334 257 A2 | 9/1989 |
| EP | 0 426 456 B1 | 5/1991 |
| EP | 0 578 536 A3 | 1/1994 |
| EP | 0 725 398 B1 | 8/1996 |
| EP | 1 045 382 A3 | 10/2000 |
| JP | 62 134852 | 6/1987 |
| JP | 62 239372 | 10/1987 |
| JP | 06 052657 | 2/1994 |
| WO | WO 01/0988 A1 | 2/2001 |
| WO | WO 02/11135 A1 | 2/2002 |

OTHER PUBLICATIONS

Material from Worldwide Web @ www.m4data–usa.com/products/magfile_1.html.

*Primary Examiner*—Andrew L. Sniezek
(74) *Attorney, Agent, or Firm*—Morrison & Foerster LLP

(57) ABSTRACT

Tape cartridge picker including a turntable that rotates in a fixed base to interface with at least one tape cartridge storage location and at least one tape drive. The turntable includes a cavity configured to receive a tape cartridge. The cavity is defined in the turntable about a central axis of rotation so that once received in the cavity, the tape cartridge may be rotated within the turntable for delivery to one of the at least one storage location and the at least one tape drive. Tape cartridges are loaded onto the turntable using a translation arm that extends horizontally from the turntable to engage or hook a tape cartridge and pull the tape cartridge into the cavity. Tape cartridges are unloaded from the turntable by extending the translation arm to slide the tape cartridge out of the cavity and into one of the at least one storage location and the at least one tape drive.

36 Claims, 23 Drawing Sheets

U.S. PATENT DOCUMENTS

| | | | |
|---|---|---|---|
| 5,430,588 A | 7/1995 | Rasmussen | 360/96.5 |
| 5,442,500 A | 8/1995 | Hidano et al. | 360/92 |
| 5,449,091 A | 9/1995 | Dalziel | 221/81 |
| 5,469,310 A | 11/1995 | Slocum et al. | 360/92 |
| 5,515,213 A | 5/1996 | Elliott | 360/92 |
| 5,537,378 A | 7/1996 | Uehara et al. | 369/77.2 |
| 5,631,785 A | 5/1997 | Dang et al. | 360/92 |
| 5,659,444 A | 8/1997 | Dang et al. | 360/98.04 |
| 5,663,938 A | 9/1997 | Dang et al. | 369/30.39 |
| 5,682,276 A | 10/1997 | Hinnen et al. | 360/92 |
| 5,746,385 A | 5/1998 | Leger et al. | 242/337 |
| 5,752,668 A | 5/1998 | Patterson et al. | 242/337 |
| 5,760,995 A | 6/1998 | Heller et al. | 360/92 |
| 5,781,517 A | 7/1998 | Nakajima | 369/30.43 |
| 5,793,564 A | 8/1998 | Nakase et al. | 360/92 |
| 5,847,897 A | 12/1998 | Marlowe | 360/92 |
| 5,856,894 A | 1/1999 | Marlowe | 360/92 |
| 5,959,803 A | 9/1999 | Okamoto et al. | 360/92 |
| 5,973,876 A | 10/1999 | Yeakloy et al. | 360/92 |
| 5,975,450 A | 11/1999 | Leger et al. | 242/337 |
| 5,999,356 A | 12/1999 | Dimitri et al. | 360/71 |
| 6,064,544 A | 5/2000 | Wada | 360/92 |
| 6,088,189 A | 7/2000 | Utsumi et al. | 360/92 |
| 6,097,566 A | 8/2000 | Heller et al. | 360/92 |
| 6,130,800 A | 10/2000 | Ostwald | 360/92 |
| 6,144,520 A | 11/2000 | Yamakawa et al. | 360/92 |
| 6,381,089 B1 | 4/2002 | Helmick et al. | 360/92 |
| 6,441,991 B2 | 8/2002 | Ostwald et al. | 360/92 |
| 6,476,999 B1 * | 11/2002 | Meikle et al. | 360/92 |
| 6,496,325 B1 | 12/2002 | Kersey et al. | 360/92 |
| 6,498,771 B1 | 12/2002 | Boyce et al. | 369/30.34 |
| 6,532,131 B1 | 3/2003 | Kappel et al. | 360/92 |

* cited by examiner

TAPE CARTRIDGE PICKER FOR AN AUTOMATED TAPE CARTRIDGE AUTOLOADER/LIBRARY SYSTEM

CROSS REFERENCE TO RELATED APPLICATIONS

This application is a continuation in part of U.S. patent application Ser. No: 09/710,645 filed on Nov. 10, 2000, titled "Automated Tape Cartridge Autoloader/Library System," and which is incorporated herein by reference in its entirety.

FIELD OF THE INVENTION

The invention is related to the field of data storage and, in particular, to a rotating tape cartridge picker that exchanges tape cartridges between at least one tape cartridge storage location and at least one tape drive in a tape cartridge autoloader/library system.

PROBLEM

A popular device for handling large amounts of information in a data processing system is an automated tape cartridge library. Tape cartridge libraries store and manage multiple tape cartridges containing magnetic tape media on which data is stored. Tape cartridge libraries include a plurality of fixed tape cartridge storage locations, at least one read/write tape drive, and a tape cartridge retrieval/transport mechanism, known in the art as a "cartridge picker." The tape cartridge storage locations are arranged in predetermined arrays of uniquely identified cells with each cell containing a single tape cartridge. Each of the individual tape cartridges includes a computer readable identifying indicia, such as a bar code, used to identify the tape cartridge for retrieval by the cartridge picker.

Cartridge pickers automatically exchange individual tape cartridges between their storage locations and the tape drive(s). Different types of cartridge pickers are used to accommodate the various tape cartridge arrangements in different tape cartridge libraries. One example of a cartridge picker utilizes a rotatable robotic arm with an optical sensor for selecting and retrieving the correct tape cartridge and transporting the tape cartridge to the tape drive(s). Another example of a cartridge picker utilizes a linear robotic mechanism that moves along an X-Y translation or about a pivot in a rotary motion to select, retrieve, and transport tape cartridges to the tape drive(s). The tape drive(s) is operable to read/write data from or to the magnetic tape in the tape cartridge.

A host computer communicates with a library control unit and the tape drive(s) to control the operation of the tape cartridge library.

Unfortunately, tape cartridge pickers are complex mechanisms that must translate among the multiple fixed tape cartridge storage locations, moving in two or three dimensions to retrieve desired tape cartridges for delivery to the tape drive(s). Thus, the tape cartridge picker is a considerable factor in the overall size of a tape cartridge library. For example, in a typical retrieval process from a storage location, the tape cartridge picker must move, usually along an X-axis, to a tape cartridge storage location, orient with the storage location, retrieve a tape cartridge from the location, move again along the X-axis to the tape drive location, orient with the tape drive, and load the tape cartridge.

Additionally, the complexity of tape cartridge pickers account for a significant component of the cost of tape cartridge libraries and require a significant amount of space to implement. In many applications, the cost of a tape cartridge library cannot be justified unless there are a large number of tape cartridges that are stored and managed by the tape cartridge library.

SOLUTION

The present invention solves the problems outlined above and advances the art by providing a rotating tape cartridge picker for a tape cartridge library, termed "autoloader/library system" herein. The present tape cartridge picker includes a turntable that rotates in a fixed base to interface with at least one tape cartridge storage location and at least one tape drive. The turntable includes a cavity configured to receive an individual tape cartridge. The cavity is defined in the turntable about a central axis of rotation so that once received in the cavity, the tape cartridge may be rotated within the turntable for delivery to at least one storage location or at least one tape drive. Advantageously, the present cartridge picker does not translate in two or three dimensions as in the prior art, but instead merely rotates within the base to position the tape cartridge picker to exchange tape cartridges with at least one storage location and at least one tape drive.

The tape cartridges are loaded onto the turntable using a translation arm that extends horizontally from the turntable to engage or hook a tape cartridge and pull the tape cartridge into the cavity. The tape cartridges are unloaded from the turntable by extending the translation arm to slide the tape cartridge out of the cavity and into at least one storage location or the at least one tape drive.

A first advantage of the present tape cartridge picker is the limited motion required to exchange tape cartridges between the various components of the autoloader/library system. For example, in prior art systems, the robotic cartridge picker must move to the storage location of a desired tape cartridge, select the tape cartridge from the storage location, move to the location of the tape drive and load the tape cartridge into the tape drive. As one skilled in the art will greatly appreciate, these operations are time consuming and require the use of complex mechanisms to move the picker within the autoloader/library system. In contrast, the present cartridge picker simply rotates between the storage locations and tape drive(s) to retrieve and deliver tape cartridges. Advantageously, this provides a fast and efficient exchange of tape cartridges within an autoloader/library system. A second advantage of the present tape cartridge picker is that it permits autoloader/library systems to be architected with coplanar components to is achieve a substantially smaller form factor. A third advantage of the present cartridge picker is that the simple construction and mechanisms used to implement the picker result in a significantly reduced cost in producing autoloader/library systems. A fourth advantage of the present tape cartridge picker is that, in the case of an autoloader/library system that is configured to mechanically and electrically interconnect with other substantially identical autoloader/library systems in a stacked configuration, the picker can be elevated to access multiple autoloader/library systems. Advantageously, elevating the cartridge picker in stacked autoloader/library systems permits tape cartridge sharing and provides efficient load balancing. A fifth advantage of the present cartridge picker is that its operation is independent of the other components of an autoloader/library system. The tape drive(s) can be reading and writing data, while the cartridge picker shuttles tape cartridges between various storage locations and other tape drives in the autoloader/library system.

DETAILED DESCRIPTION

Figure 1:
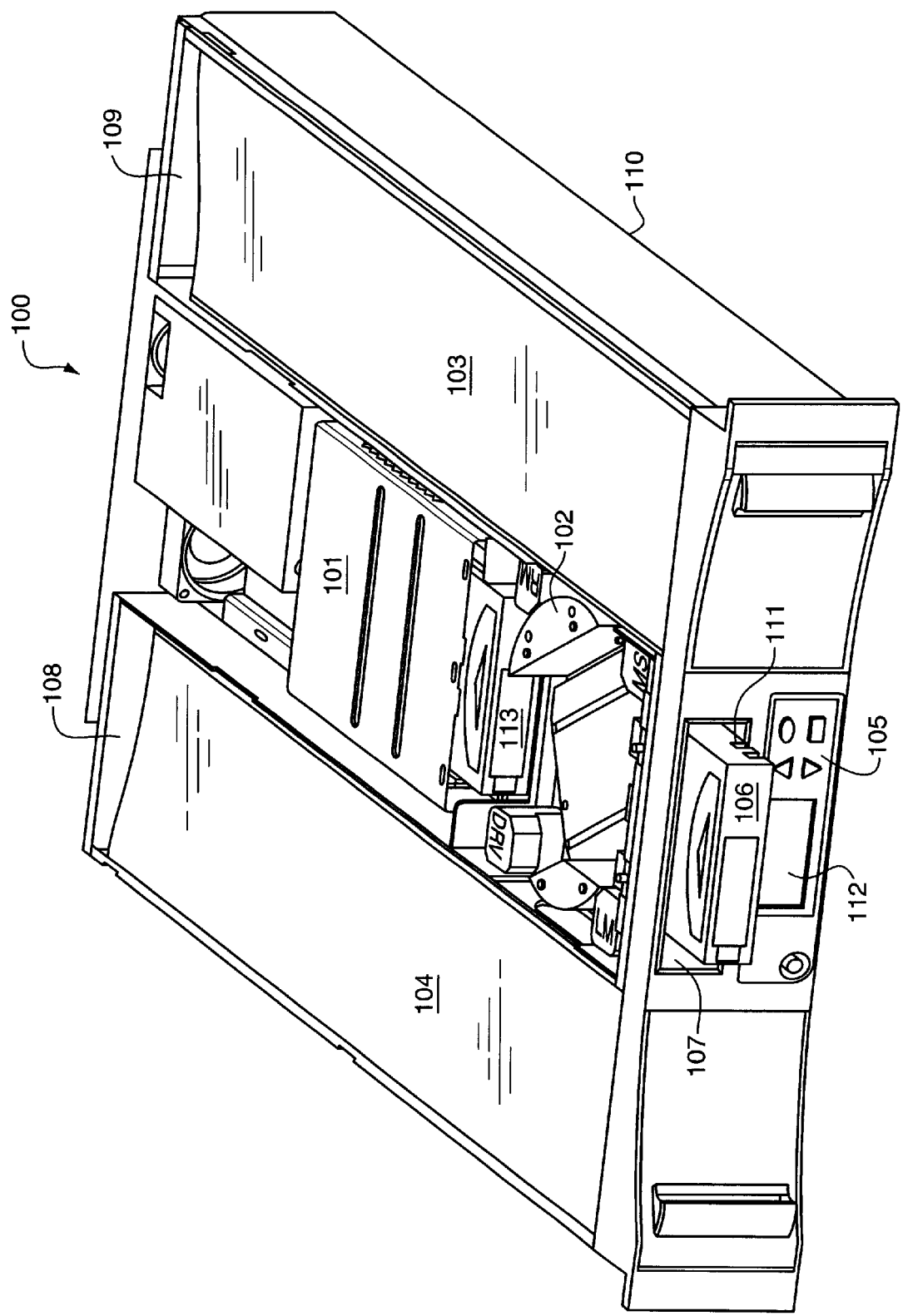
FIG. 1 illustrates an example of a tape cartridge autoloader/library system configured with a tape cartridge picker according to the present invention.
Figure 2:
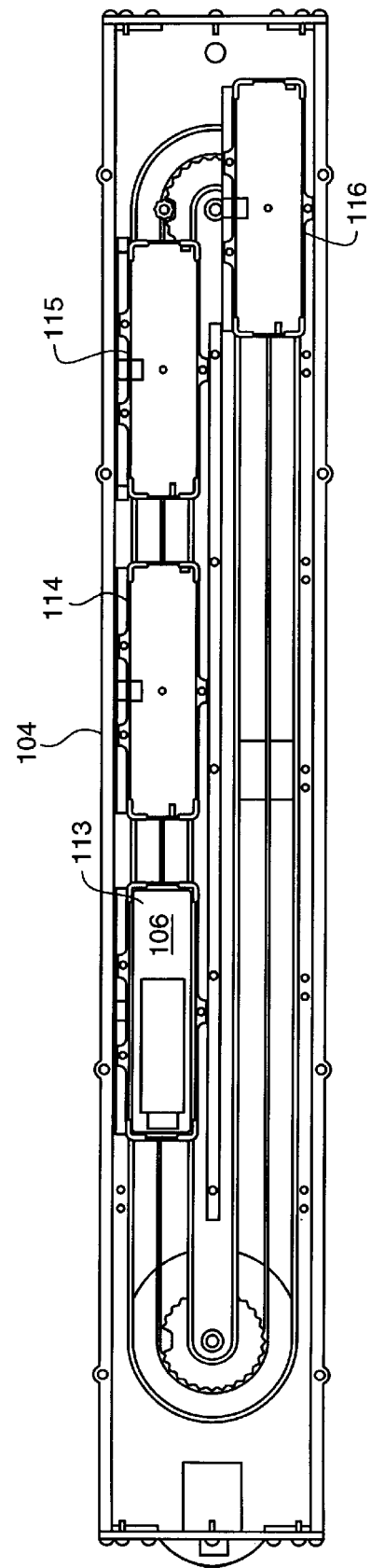
FIG. 2 illustrates an example of a tape cartridge transport magazine for an autoloader/library system configured with a tape cartridge picker according to the present invention.

Tape Cartridge Autoloader/Library Systems—FIGS. 1 and 2:

For purposes of illustration and not of limitation, various features and advantages of the present tape cartridge picker will now be described within the context of an autoloader/library system configured to accommodate a plurality of DLT tape cartridges. It is to be understood that the following description with respect to the example of the autoloader/library system and DLT tape cartridges disclosed herein is not intended to limit the scope of the present invention. It would be obvious to one skilled in the art that the principles of the present invention could easily be applied to other tape libraries, autoloaders, autoloader/library systems and tape cartridge formats.

FIG. 1 depicts an example of an automated tape cartridge autoloader/library system 100. The primary components of the autoloader/library system 100 are a read/write tape drive 101, a tape cartridge picker 102 according to the present invention, a single tape cartridge interface 107, and a pair of tape cartridge transport magazines, 103 and 104, enclosed in a housing 110. The autoloader/library system 100 also comprises a control panel 105 that receives control inputs from an operator and includes a user interface 112 to provide status information to the operator.

The autoloader/library system 100 is a complete tape cartridge library that stores, manages, and automatically exchanges a plurality of tape cartridges, e.g. 106 and 113, between the tape drive 101, the single cartridge interface 107, and the tape cartridge transport magazines, 103 and 104. The autoloader/library system 100 could also include multiple tape drives and could be configured to accommodate multiple tape media formats as a matter of design choice by simply incorporating the appropriate tape drive format into the autoloader/library system 100. Some examples of the tape cartridge media 106 include without limitation, DLT, LTO, 8 millimeter, and SDLT tape cartridges.

Advantageously, the autoloader/library system 100 includes a compact form factor due in large part to the cartridge picker 102 of the present invention. In one example of the autoloader/library system 100, the housing 110 including the tape cartridge transport magazines, 103 and 104, the tape drive 101, the cartridge picker 102, and all control elements including motors, circuitry, and processors, measures approximately 3.75 inches in height and fits in a standard rack mount. Also, advantageously, the storage and management of the plurality of tape cartridges, e.g. 106 and 113, in the compact form factor of the autoloader/library system 100 is provided by the cartridge picker 102 in combination with the individual tape cartridge transport magazines, 103 and 104.

The tape cartridge transport magazines, 103 and 104, are each configured to receive and store a plurality of individual tape cartridges, e.g. 106, in a plurality of individual tape cartridge storage locations. The tape cartridge transport magazines, 103 and 104, are also configured to transport the individual tape cartridges, e.g. 106, in a vertical closed loop within the tape cartridge transport magazines, 103 and 104, so that any one of the stored tape cartridges can be positioned for selection by the cartridge picker 102. FIG. 2 depicts a cross sectional view of the interior of the tape cartridge transport magazine 104 used to illustrate the transportation of the tape cartridges within the tape cartridge transport magazines, 103 and 104. The plurality of tape cartridges are loaded into the tape cartridge transport magazines, 103 and 104, by sliding the individual tape cartridges, e.g. 106, into individual carriages, e.g. 113–116, in a horizontal relationship relative to the magazines, 103 and 104. The tape cartridges, e.g. 106, are transported in the magazine 104 by rotating the carriages 113–116 within the vertical closed loop to the different locations in the tape cartridge magazine 104.

The cartridge picker 102 is configured to rotate and exchange the individual tape cartridges, e.g. 106, with one of the tape drive 101, the magazine 104, the magazine 103, and the single cartridge interface 107. Advantageously, the use of the rotating cartridge picker 102 in combination with the transport mechanisms in the magazines, 103 and 104, significantly limits the operation required for a tape cartridge exchange. The present cartridge picker 102 simply rotates between the tape cartridge transport magazines, 103 and 104, the single cartridge interface 107, and the tape drive 101, to exchange tape cartridges, e.g. 106. Advantageously, the autoloader/library system 100 configured with the present cartridge picker 102 provides fast and efficient exchange of tape cartridges, e.g. 106, between the magazines, 103 and 104, the single cartridge interface 107, and the tape drive 101. Additionally, the rotating cartridge picker 102 in combination with the transport magazines, 103 and 104, permits a coplanar construction of the autoloader/library system 100 facilitating the compact form factor. It should also be noted that the tape cartridges, e.g. 106, are not flipped or re-oriented during transport within the tape cartridge transport magazines, 103 and 104, or during exchange with the cartridge picker 102. The tape cartridges, e.g. 106, are always in the proper orientation for retrieval by the cartridge picker 102, and for presentation to the tape drive 101, single cartridge interface 107, and tape cartridge magazines, 103 and 104.

Once selected by the cartridge picker 102, an individual tape cartridge, e.g. 106, could be provided to one of the following locations depending on the desired operation to be performed. If a read/write operation is desired, the cartridge picker 102 provides the selected tape cartridge 106 to the tape drive 101. If an ejection operation is desired, the cartridge picker 102 provides the selected tape cartridge 106 to the single cartridge interface 107 for retrieval by an operator. If a load balancing operation is desired, the cartridge picker 102 exchanges the tape cartridge 106 between tape cartridge transport magazine 103 and tape cartridge transport magazine 104. As will become apparent from the following description, the cartridge picker 102 could also provide the selected tape cartridge 106 to another tape cartridge transport magazine in another coupled tape cartridge autoloader/library system. Finally, the cartridge picker 102 could provide the selected tape cartridge, e.g. 106, to another tape drive in a coupled tape cartridge autoloader/library system.

The Cartridge Picker FIGS. 3–6:

For purposes of illustration, the tape cartridge 106 is used throughout the following description of the cartridge picker 102. It should be understood, however, that the cartridge picker 102 could be easily designed according to the principles of the present invention to accommodate numerous tape cartridge formats other than the DLT format of the cartridge 106.

Figure 3:
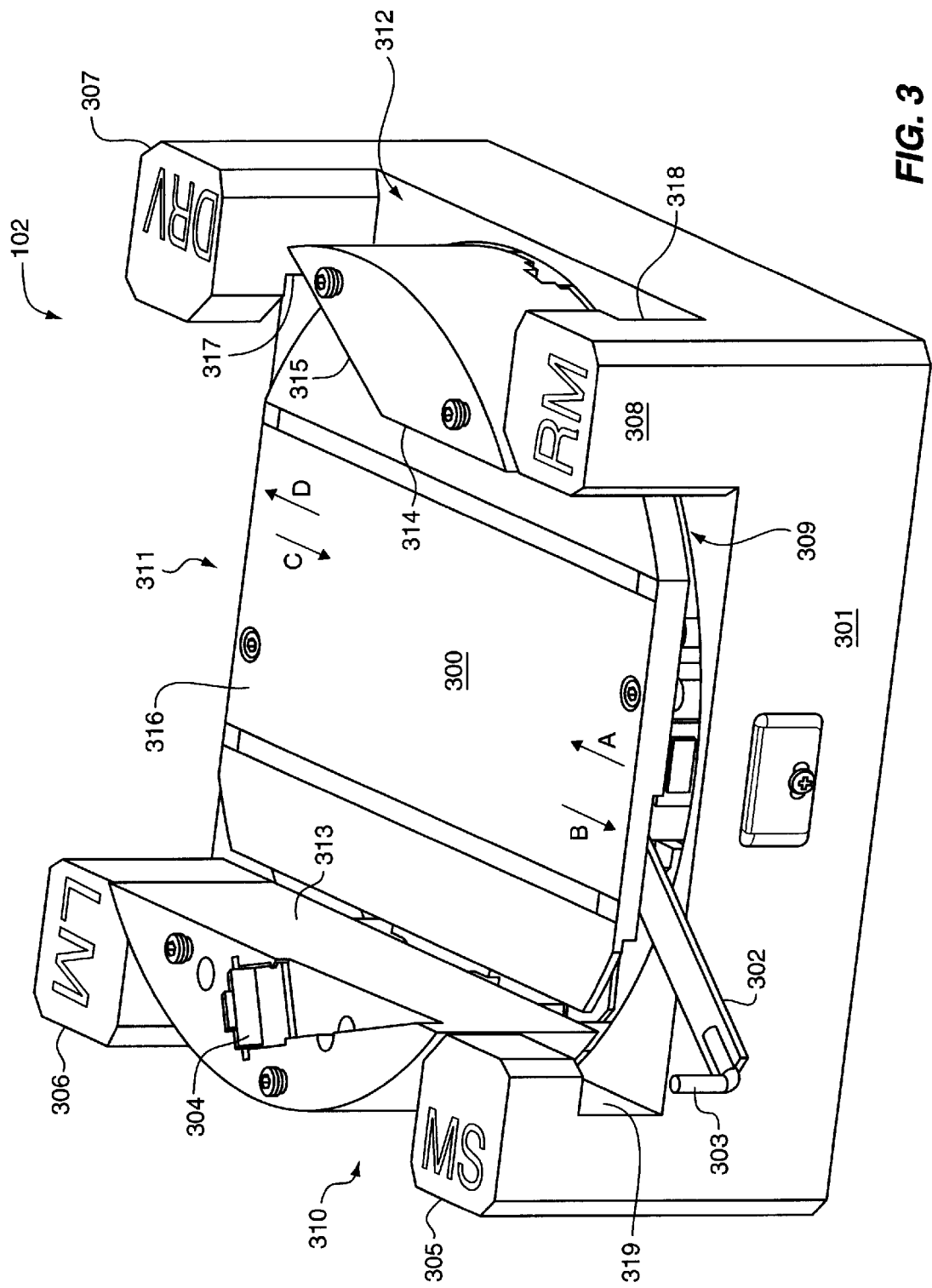
FIG. 3 illustrates an example of a tape cartridge picker according to the present invention.

FIGS. 3–6 depict various examples of the tape cartridge picker 102 according to the present invention. Referring first to FIG. 3, the cartridge picker 102 comprises a translation arm 302 and a turntable 300 rotatably connected to a stationary base 301. The turntable 300, includes a central cavity 316 configured to receive the tape cartridge 106 on the turntable 300. Parallel walls, 313 and 314, and a wall 315 integrally formed at a thirty-degree angle to wall 314, define the central cavity 316. Alternatively, the wall 315 could be formed at an angle in the range of twenty to forty degrees depending on the geometry of the cartridge. As will become apparent from the following description, the angle of the wall 315 permits the translation arm 302 to pass behind the tape cartridge 106 during loading from the single cartridge interface 107. The translation arm 302 comprises a perpendicular cartridge pin 303 integrally formed in one end. The pin 303 is configured to engage or seat in a notch 111 (shown on FIG. 1) formed in the tape cartridge 106.

The cartridge picker 102 also comprises a bar code reader 304 for reading computer readable indicia on the tape cartridges. The bar code reader 304 could be configured in any suitable manner that permits the bar code reader 304 to read the indicia on the tape cartridges. In one example of the present invention, the bar code reader 304 includes a mirror that reflects an image of the indicia on the tape cartridge to the bar code reader 304. Advantageously, since the cartridge picker 102 rotates, the bar code reader 304 could be located at numerous other locations on the cartridge picker 102 as a matter of design choice. Alternatively, in some applications, the bar code reader 304 could be separate from the picker 102 and located in the autoloader/library system 100.

The picker base 301 comprises four vertical columns 305–308 that define four cartridge exchange ports 309–312. As will become apparent from the following description, columns 305, 307, and 308 are undercut in portions 317–319 so that the columns 305, 307, and 308 do not interfere with the translation arm 302 during retrieval and delivery of the tape cartridge 106. Operationally, the turntable 300 rotates within the base 301 to exchange the tape cartridge 106 with the single cartridge interface 107 the tape drive 101 and the tape cartridge transport magazines, 103 and 104, through the exchange ports 309–312. Specifically, the turntable 300 exchanges the tape cartridge 106 with the magazine 103 through the exchange port 309, exchanges the tape cartridge 106 with the single cartridge interface 107 through the exchange port 310, exchanges the tape cartridge 106 with the magazine 104 through the exchange port 311, and exchanges the tape cartridge 106 with the tape drive 101 through the exchange port 312.

Figure 4:
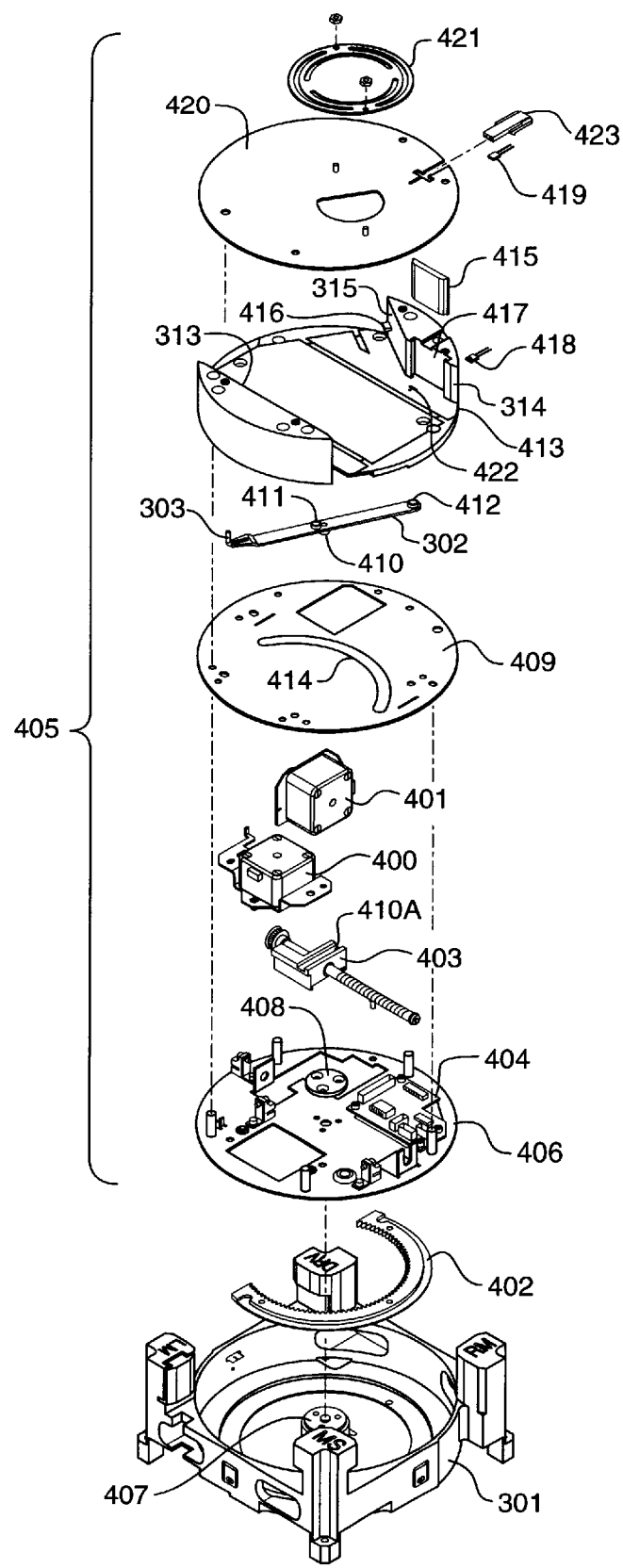
FIG. 4 illustrates an assembly view of the tape cartridge picker according to the present invention.
Figure 5:
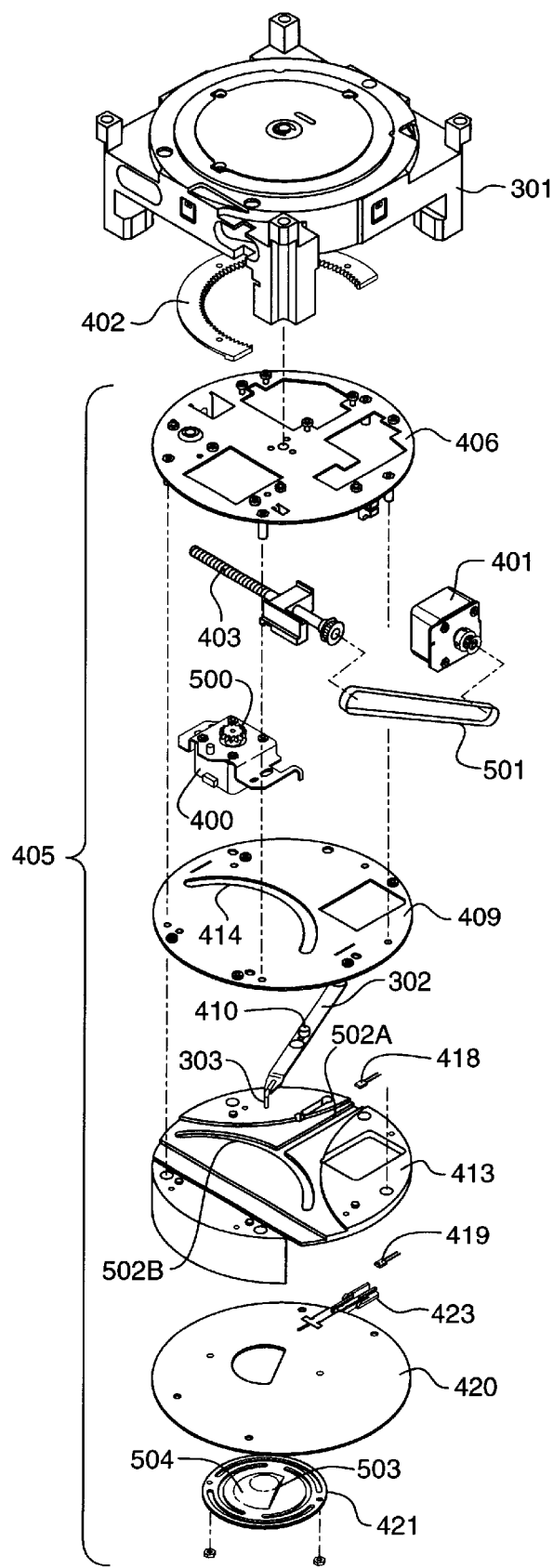
FIG. 5 illustrates another assembly view of the tape cartridge picker according to the present invention.
Figure 6:
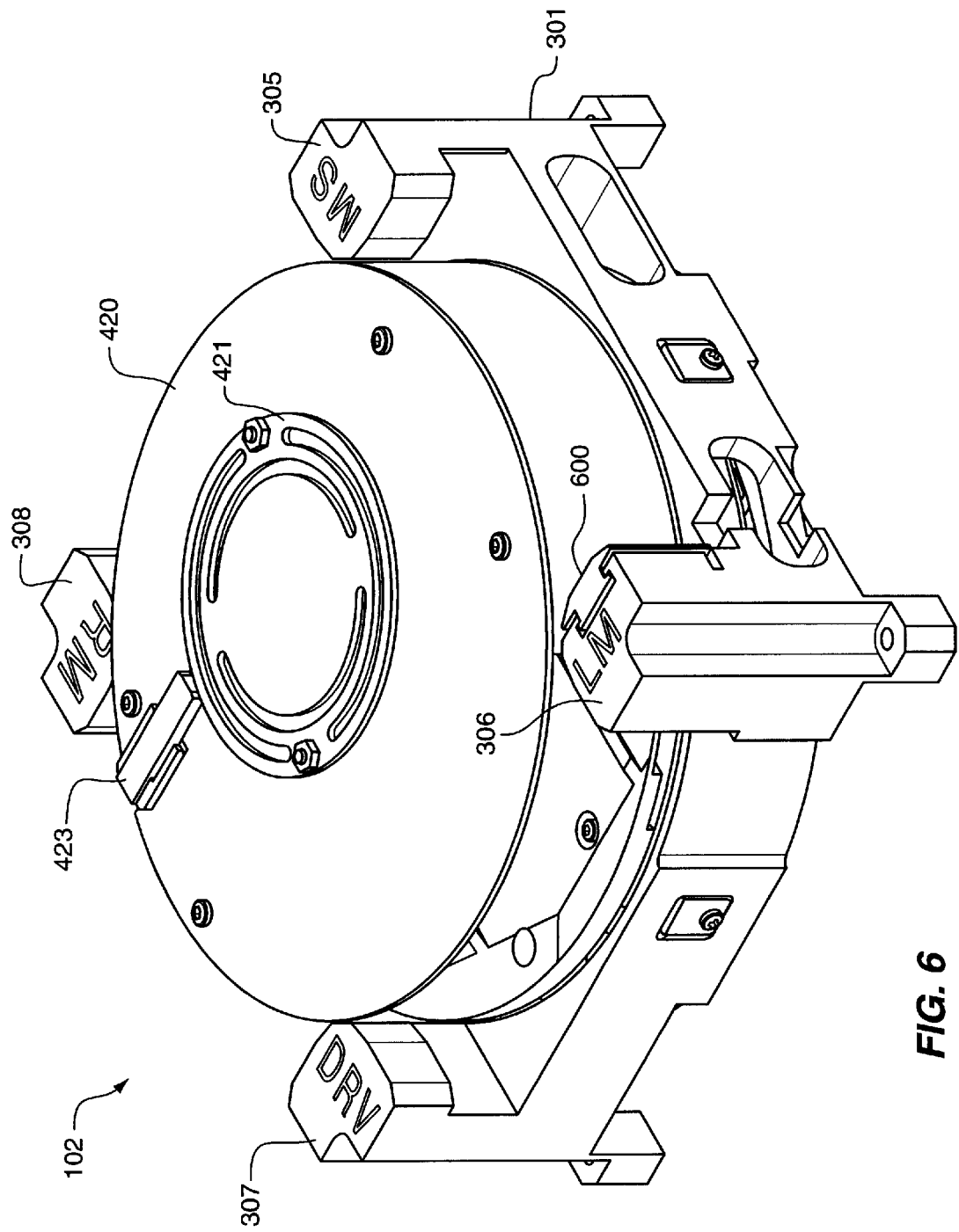
FIG. 6 illustrates an assembled view of the tape cartridge picker according to the present invention.

FIGS. 4 and 5 illustrate assembly view of the tape cartridge picker 102, with FIG. 4 being a top down assembly view and FIG. 5 being a bottom up assembly view. FIG. 6 illustrates a perspective assembled view of the cartridge picker 102. Two motors control the operation of the cartridge picker 102. A rotation motor 400 rotates a spur gear 500 that couples to a ring gear 402 mounted in the base 301 to rotate the turntable assembly 405. A translation motor 401 and lead screw 403, connected by a belt 501, operate to extend and retract the translation arm 302. The operation of the picker 102 is controlled by control circuitry 404, mounted on a bottom plate assembly 406. Flex cables (not shown) fed up from the bottom of the base 301, provide power to the control circuitry 404. Those skilled in the art will appreciate that the rotation motor 400 could also be located within the autoloader/library system 100 or connected to the base 301. In this case the rotation of the picker 102 could be accomplished using a belt and mating drive gear connected to the bottom plate assembly 406.

The turntable assembly 405 rotates around the ring gear 402, which is internally coupled to the base 301. Alternatively, those skilled in the art will appreciate that the ring gear 402 could be integrally formed in the base 301. The bottom plate assembly 406 is fastened by a coupling plate 408 to a bearing member 407 centrally located in the base 301. The translation motor 401 and the rotation motor 400 mount to the bottom plate assembly 406 and are housed between the bottom plate assembly 406 and a middle plate 409. The translation arm 302 is slidably mounted between the middle plate 409 and the cavity portion 413 of the turntable 300. The translation arm 302 includes a roller 410 that passes through channel 414 with clearance in the middle plate 409 and is driven by channel 410(a) in the lead screw 403. Rollers 411 and 412 ride in channels 502(a) and 502(b) respectively formed in the bottom of the cavity portion 413.

A plate 420 provides a top cover for the turntable assembly 405. The plate 420 also provides a mount for a cartridge stop/compression pad 421. As will become apparent from the following description, the cartridge stop/compression pad 421 stops the insertion of the tape cartridge 106 from the single cartridge interface 107 to position the cartridge 106 for engagement by the translation arm 302 and the pin 303. When the tape cartridge 106 is received from all other locations, i.e. the magazines 103 and 104 and the tape drive 101, the cartridge stop/compression pad 421 functions as a compression pad to permit the cartridge 106 to be fully received into the cavity 316.

The wall 314 of the cavity portion 413 includes a flex wall 415 configured to slide into notch 417. The flex wall 415 is spring loaded within the notch 417 and functions to bias the tape cartridge 106 against the opposing wall 313 when the tape cartridge 106 is received in the cavity 316. Advantageously, this prevents the pin 303 from disengaging from the cartridge notch 111 when the tape cartridge 106 is loaded and unloaded from the cavity 316. The wall 315 includes a key 416 configured to mate with a corresponding groove on the side of the tape cartridge 106 to prevent mis-insertion of the tape cartridge 106 when the tape cartridge 106 is received from the single cartridge interface 107. Advantageously, this prevents an operator from forcing the tape cartridge 106 into the single cartridge interface 107 in the wrong orientation and damaging the cartridge picker 102.

Figure 20:
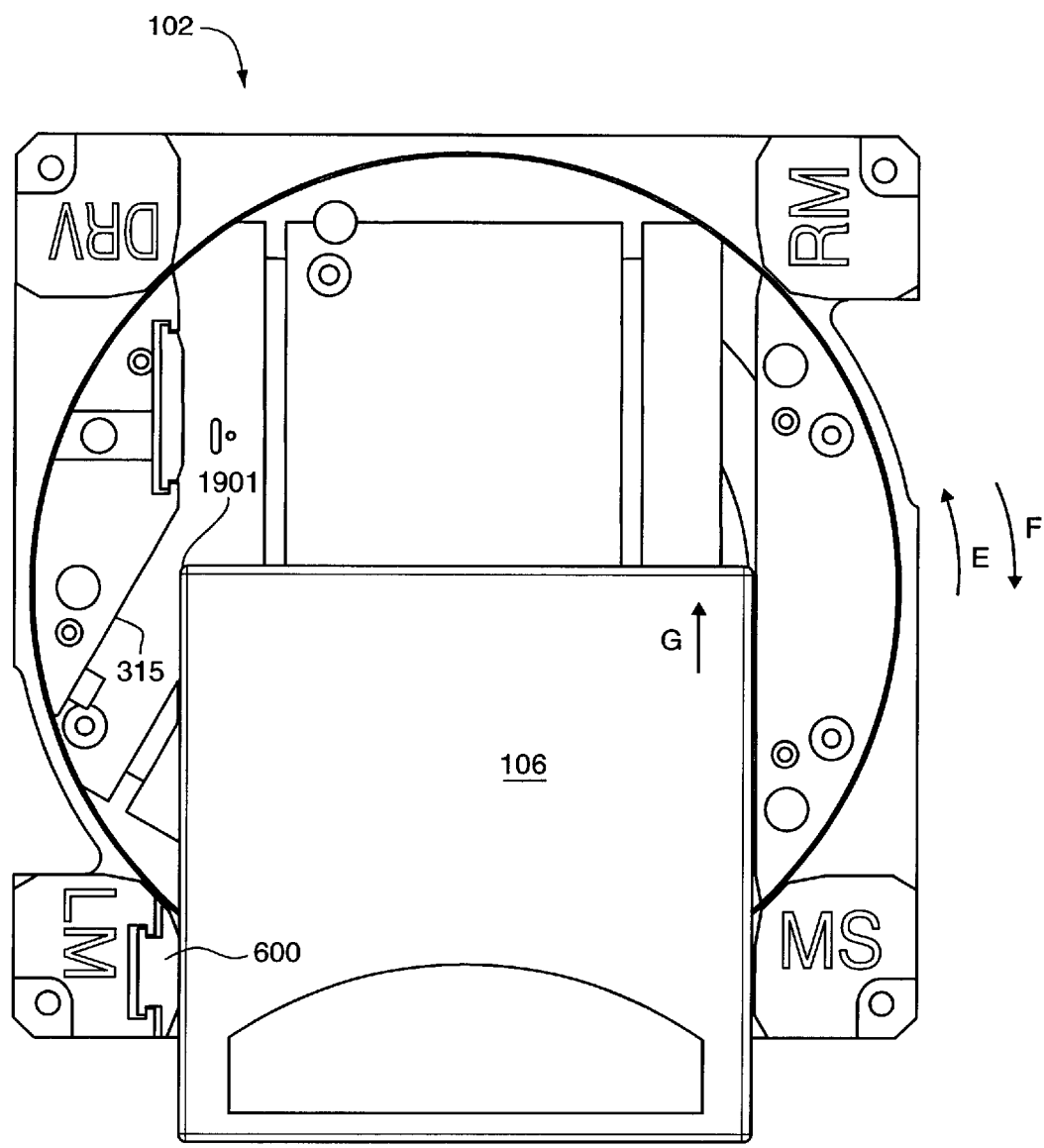
FIG. 20 is another perspective view illustrating the operation of a tape cartridge picker according to the present invention.

Referring to FIG. 6, a second flex wall 600 is included on the column 306. The second flex wall 600 is also spring loaded to guide the tape cartridge 106 during insertion from the single cartridge interface 107, and prevents the pin 303 from disengaging from the cartridge notch 111. Referring to FIG. 20, flex wall 600 also prevents the cartridge 106 from rotating counter clockwise during transition onto the cavity 316, so that the corner 1901 does not rotate and collide with wall 315 as the translation arm 302 pulls the cartridge 106 in the direction (G).

The cartridge picker 102 also includes a cartridge present sensor comprising an emitter portion 418 and a detector portion 419. The emitter portion 418 is mounted on the underside of the cavity 413 of the cartridge picker 102 and aligns with the aperture 422 to provide a signal to the detector portion 419. The detector portion 419 is mounted in the housing 423, which couples to the plate 420. Operationally, a cartridge present condition is indicated when the tape cartridge 106, inserted into the cavity 316, blocks the aperture 422 and the detector portion 419 detects no signal. Similarly, a cartridge not present condition is indicated by a continuous reception of signal by the detector portion 419 from the emitter portion 418. Those skilled in the art will appreciate that the detector portion 419 and the emitter portion 418 could be easily reversed.

Tape Cartridge Picker Operation FIGS. 7–22:

When the tape cartridge 106 is exchanged between the cartridge picker 102 and the tape drive 101, or between the cartridge picker 102 and the magazines 103 and 104, the cartridge 106 is received in the cavity 316 in direction (A) and ejected from the cavity 316 in direction (B) as exemplified in FIG. 3. In the context of this application this is defined as the front of the turntable 300 regardless of the exchange port, e.g. 309, that it is aligned with. Similarly, when the tape cartridge 106 is exchanged between the cartridge picker 102 and the single cartridge interface 107, the cartridge 106 is received in the cavity 316 from the opposite end of the cavity 316 in direction (C) and ejected from the cavity 316 in direction (D). In the context of the present application this is defined as the rear of the turntable 300 regardless of the exchange port, e.g. 309, that it is aligned with. As will become apparent from the following description, this permits the cartridge to always be oriented in the same direction when it is located in the cavity 316.

Figure 12:
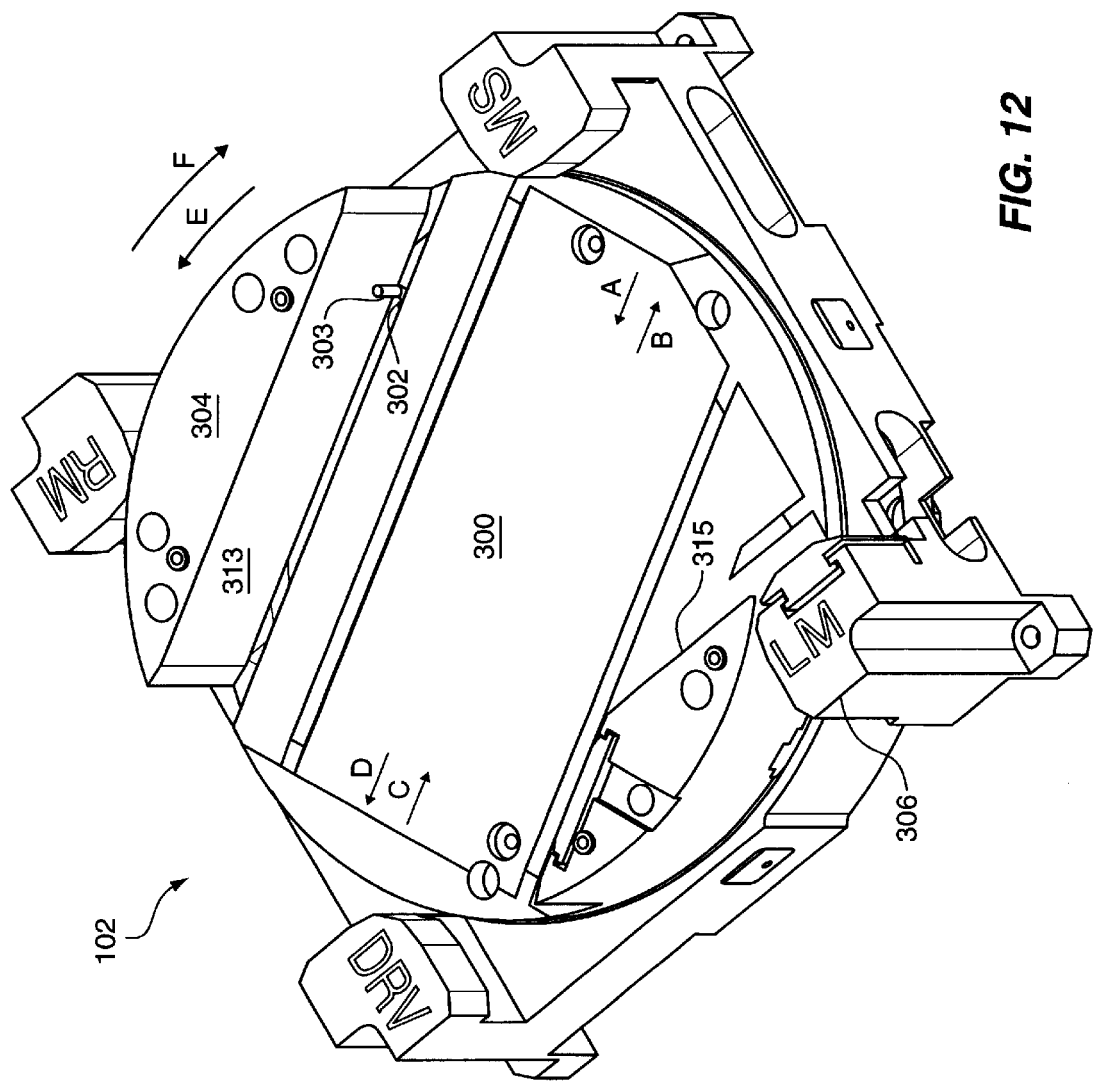
FIG. 12 is a perspective view illustrating the operation of a tape cartridge picker according to the present invention.
Figure 13:
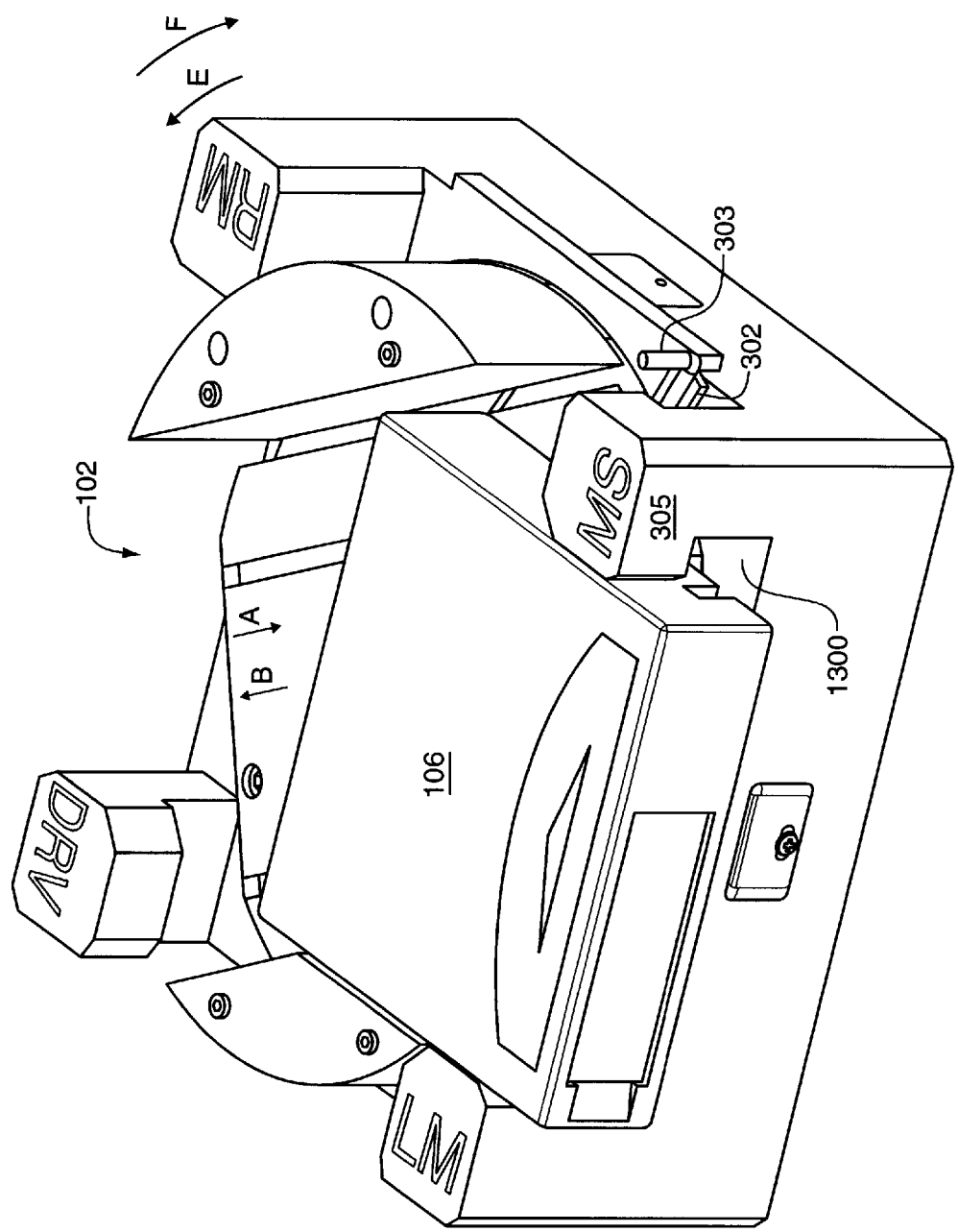
FIG. 13 is another perspective view illustrating the operation of a tape cartridge picker according to the present invention.

The translation arm 302 has three primary positions but, as will also become apparent, other positions are used during the exchange of tape cartridges from the tape drive 101, the single cartridge interface 107 and the magazines 103 and 104. The first primary position, shown in FIG. 12, is defined as the home position. In the home position the turntable 300 is free to rotate regardless of whether the tape cartridge 106 is present in the cavity 316 or absent from the cavity 316. Additionally, the home position is used regardless of whether the tape cartridge 106 is received from the front or the rear of the turntable 300. The second primary position, shown in FIG. 3, is defined as the forward extension position. In the forward extension position, the translation arm 302 is ready to engage the tape cartridge 106 and suck the cartridge 106 in the direction (A) from the tape drive 101, or the magazines 103 and 104 into the cavity 316. The third primary position, shown in FIG. 13, is defined as the reverse extension position. In the reverse extension position, the translation arm 302 is positioned to engage the tape cartridge 106 and suck the cartridge 106 in the direction (C) from the single cartridge interface 107 into the cavity 316.

Figure 7:
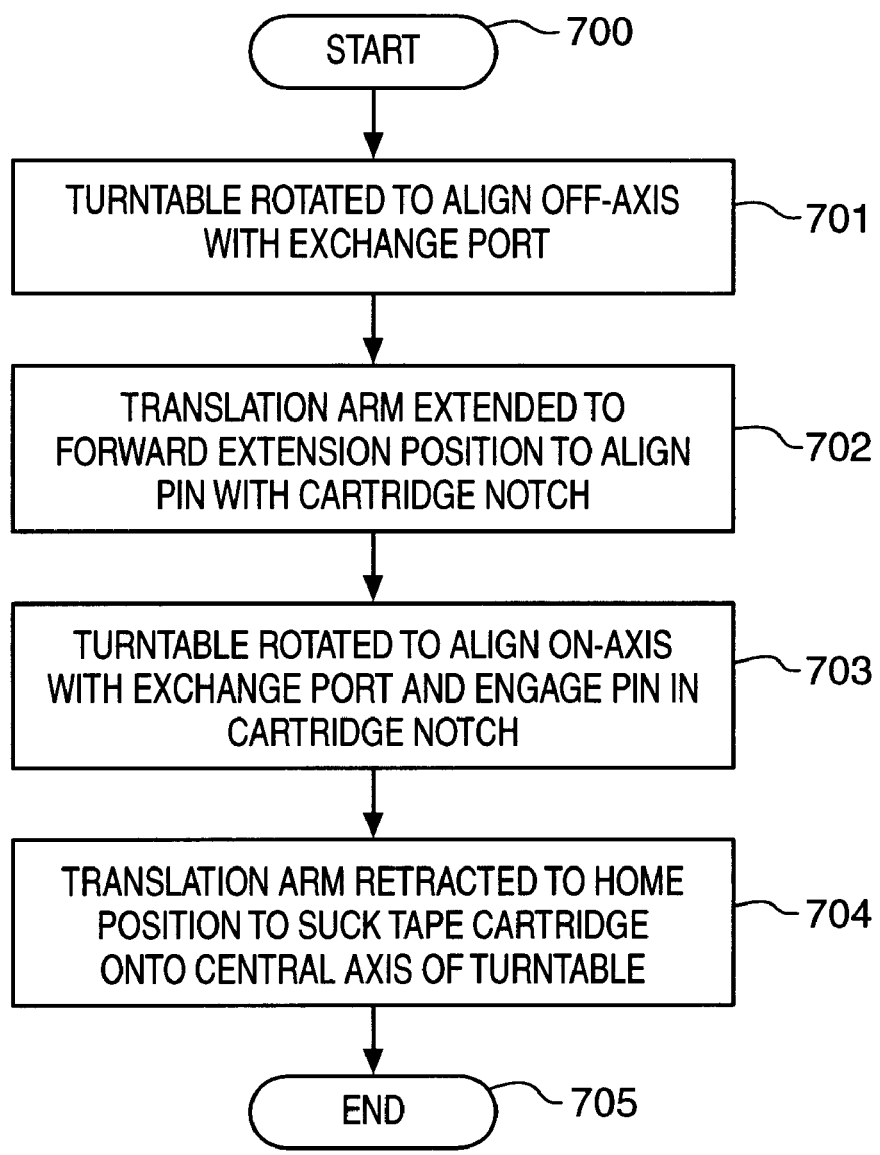
FIG. 7 is a flow chart illustrating an example of the operation of a tape cartridge picker according to the present invention.

FIG. 7 is a flow chart illustrating the operation of the cartridge picker 102 during retrieval of the tape cartridge 106 from the tape cartridge transport magazine 103. Those skilled in the art will appreciate that the operation is substantially identical for retrieval of the tape cartridge 106 from the tape cartridge transport magazine 104 and for retrieval of the tape cartridge 106 following ejection from the tape drive 101.

When one of the tape cartridge transport magazines, 103 or 104, is inserted into the autoloader/library system 100, the autoloader/library system 100 performs an inventory operation using sensors to determine which carriages, e.g. 113–116, contain tape cartridges and which carriages are empty. Thus, the autoloader/library system 100 automatically maintains an inventory of loaded tape cartridges during operation. The autoloader/library system 100 also maintains data indicative of the location of specific tape cartridges within the magazines, 103 and 104, so that a desired tape cartridge can be provided to the cartridge picker 102.

Figure 14:
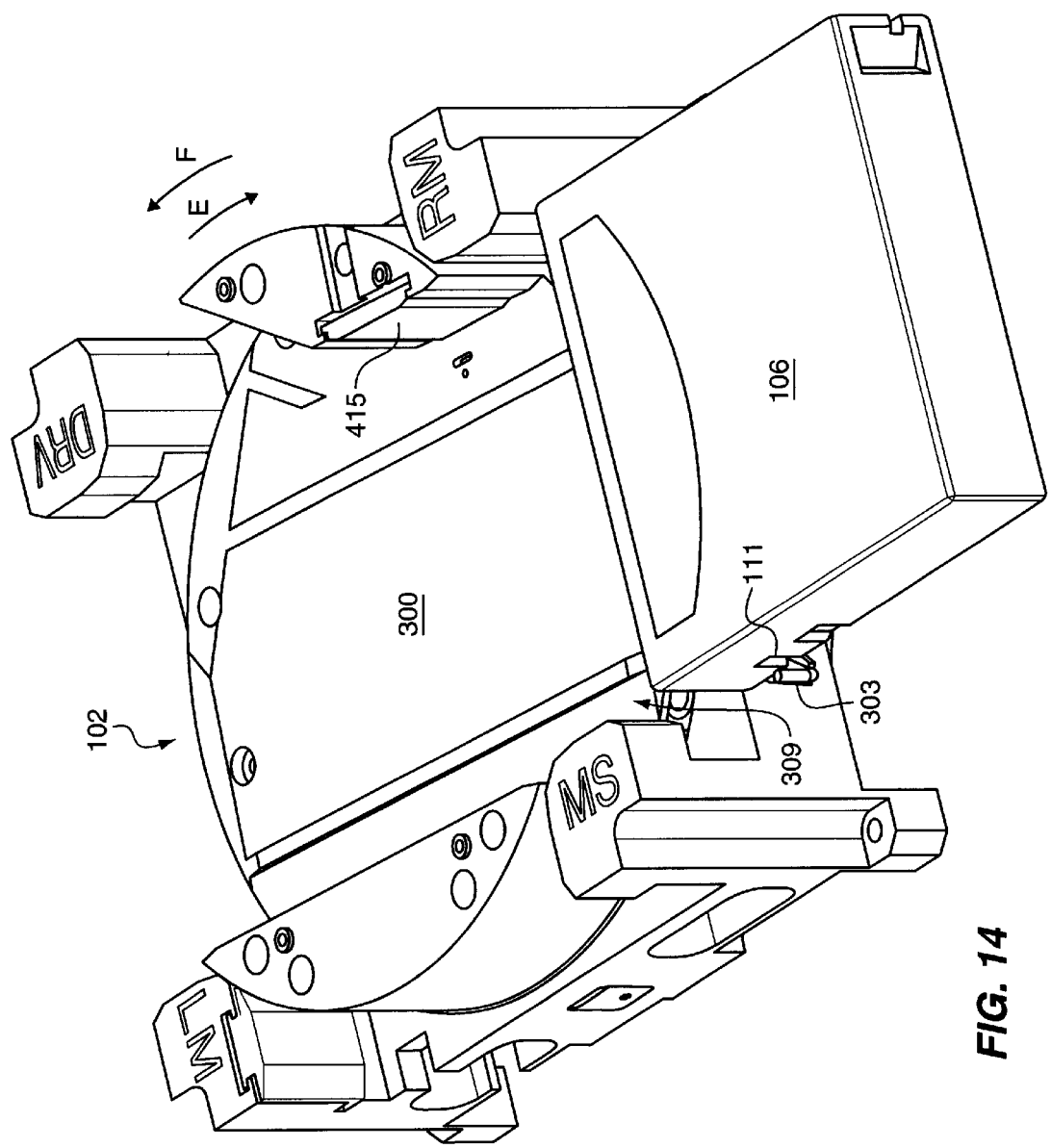
FIG. 14 is another perspective view illustrating the operation of a tape cartridge picker according to the present invention.

On FIG. 7 the operation begins at step 700 with the translation arm 302 in the home position of FIG. 12. At step 701, the turntable 300 is rotated to align off-axis with the exchange port 309, as shown in FIG. 14. In the context of the present invention, an off-axis alignment is defined as any position of the turntable 300 where either the rear of the turntable 300 or the front of the turntable 300 is not aligned with one of the exchange ports 309–312. Similarly, an on-axis alignment is defined as any position of the turntable 300 where either the rear of the turntable 300 or the front of the turntable 300 is aligned with one of the exchange ports 309-312. In this case, the off-axis alignment refers to aligning the front of the turntable 300 approximately three and one half degrees past the exchange port 309 in the direction (E) and permits extension of the translation arm 302 to the forward extension position without contacting the tape cartridge 106. Alternatively, the off-axis alignment could be any position that permits the translation arm 302 to be extended to the forward extension position without contacting the tape cartridge 106.

Figure 15:
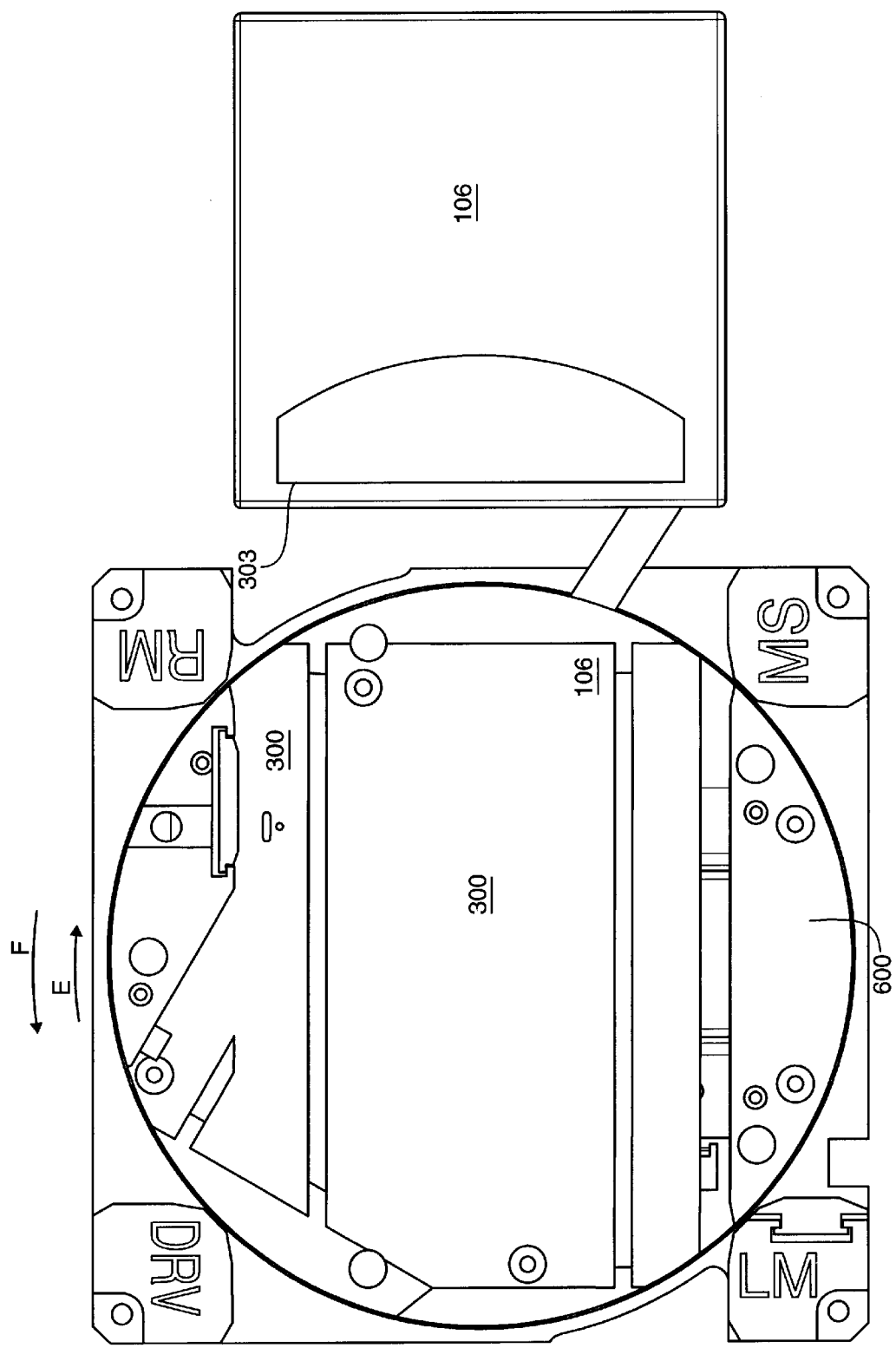
FIG. 15 is another perspective view illustrating the operation of a tape cartridge picker according to the present invention.
Figure 16:
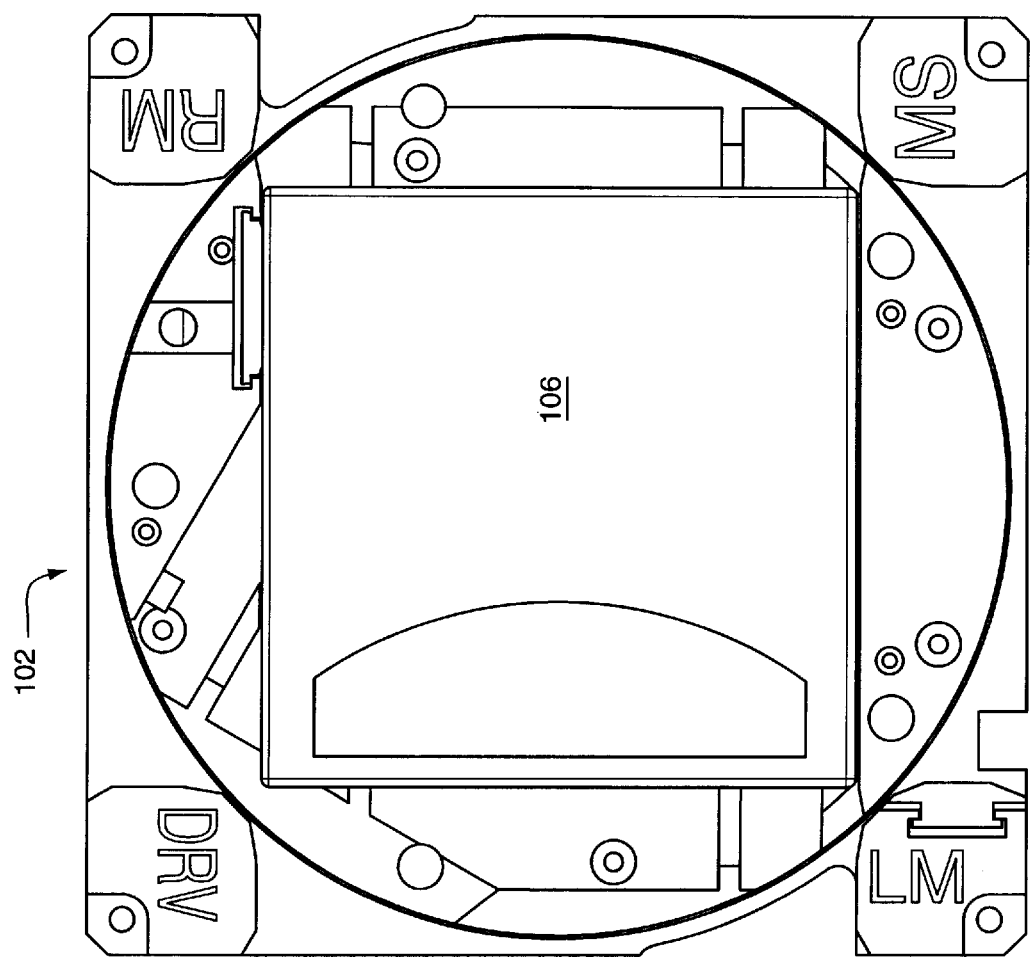
FIG. 16 is another perspective view illustrating the operation of a tape cartridge picker according to the present invention.

Substantially simultaneously, the transport magazine 103 transports the carriage, e.g. 113, containing the desired tape cartridge 106 to the storage location aligned with the cartridge picker 102. At step 702, the translation arm 302 is extended to the forward extension position so that the pin 303 is aligned with the cartridge notch 111 in the tape cartridge 106. At step 703 the turntable is rotated three and one half degrees in the direction (F) to align the front of the turntable 300 on-axis with the exchange port 309 and engage or seat the pin 303 in the cartridge notch 111, as shown in FIG. 15. At step 704, the translation arm 302 is retracted to the home position of FIG. 12 to suck the tape cartridge 106 into the cavity 316 and onto the central axis of the turntable 300, as shown in FIG. 16. The operation ends at step 705. Advantageously, once in this position, the turntable 300 and cartridge 106 may be freely rotated to deliver the tape cartridge 106 to the tape drive 101, the magazine 104, or the single cartridge interface 107.

Figure 8:
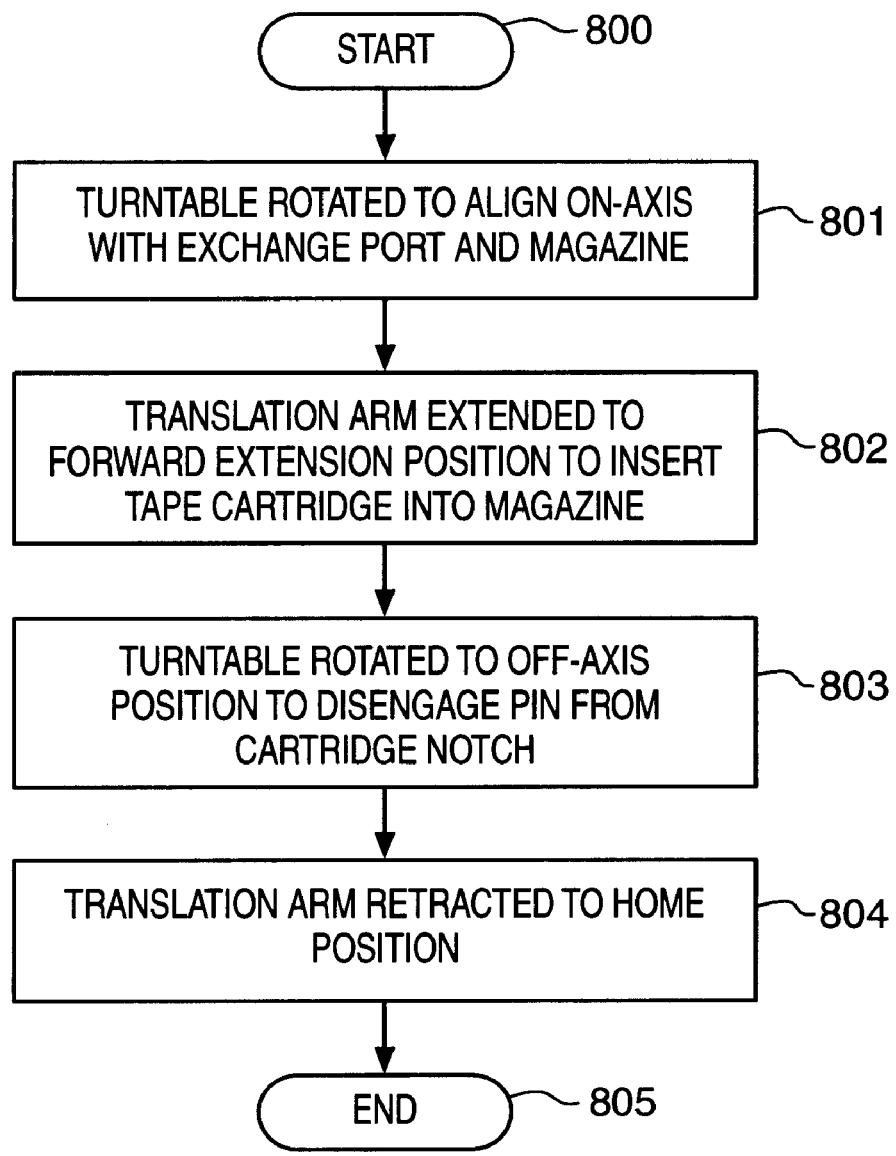
FIG. 8 is a flow chart illustrating another example of the operation of a tape cartridge picker according to the present invention.

FIG. 8 is a flow chart illustrating the delivery of the tape cartridge 106 to the tape cartridge transport magazine 104. Those skilled in the art will appreciate that the operation is substantially identical for delivery of the tape cartridge 106 to the tape cartridge transport magazine 103.

On FIG. 8, the operation begins at step 800 with the tape cartridge 106 loaded onto the cartridge picker 102 as described in FIG. 7. At step 801, the turntable 300 is rotated to align the front of the turntable on-axis with the exchange port 311 and the tape cartridge magazine 104. Substantially simultaneously, the transport magazine 103 transports an empty carriage, e.g. 114, to the storage location aligned with the cartridge picker 102. At step 802, the translation arm 302 is extended to the forward extension position to insert the tape cartridge 106 into the carriage 114 in the tape cartridge magazine 104, as exemplified by FIG. 15. At step 803, the turntable 300 is again rotated in the direction (E) to the three and one half degrees off-axis position to disengage the pin 303 from the cartridge notch 111, as exemplified by FIG. 14. At step 804, the translation arm is retracted to the home position of FIG. 12, so that the turntable 300 is free to rotate and perform additional operations and the operation ends at step 805.

Figure 9:
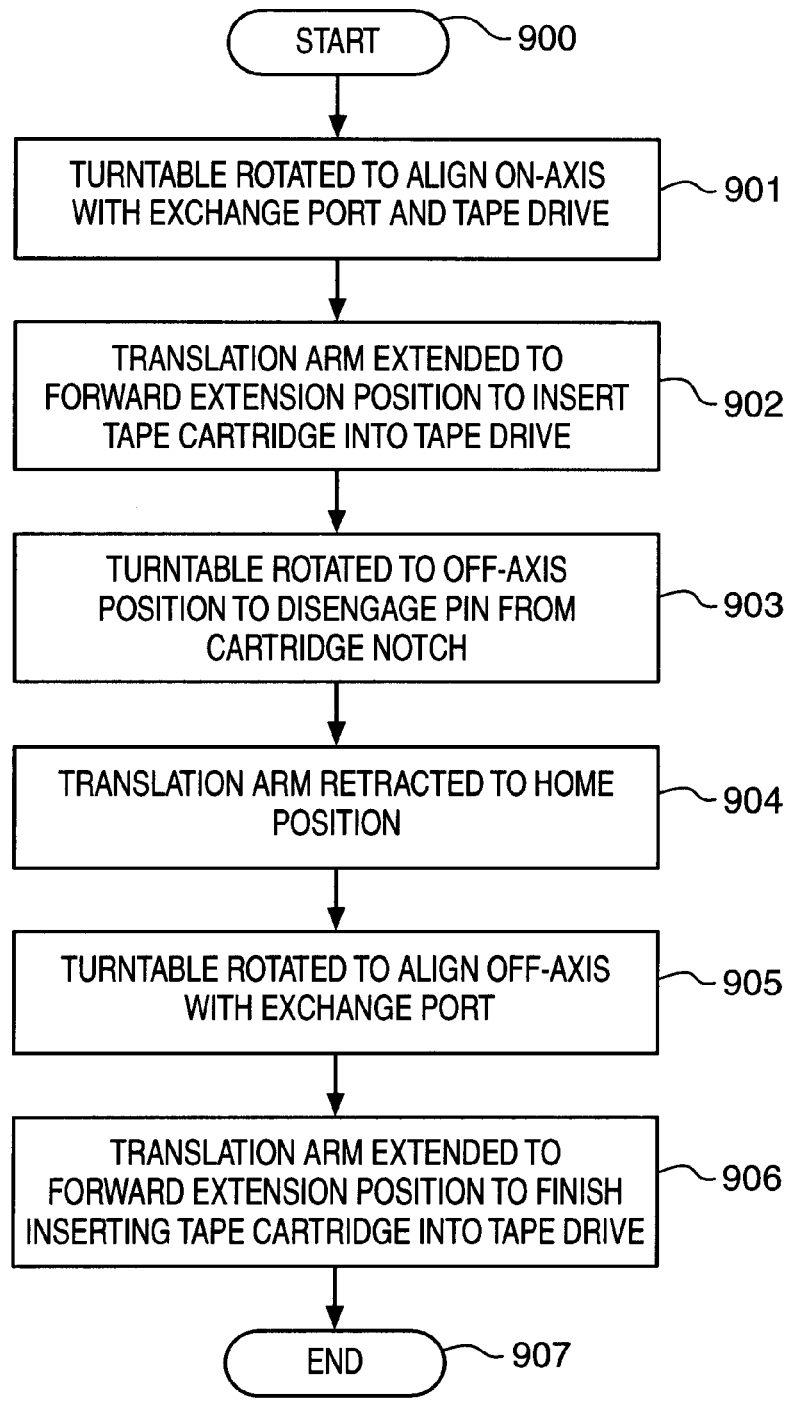
FIG. 9 is a flow chart illustrating another example of the operation of a tape cartridge picker according to the present invention.
Figure 17:
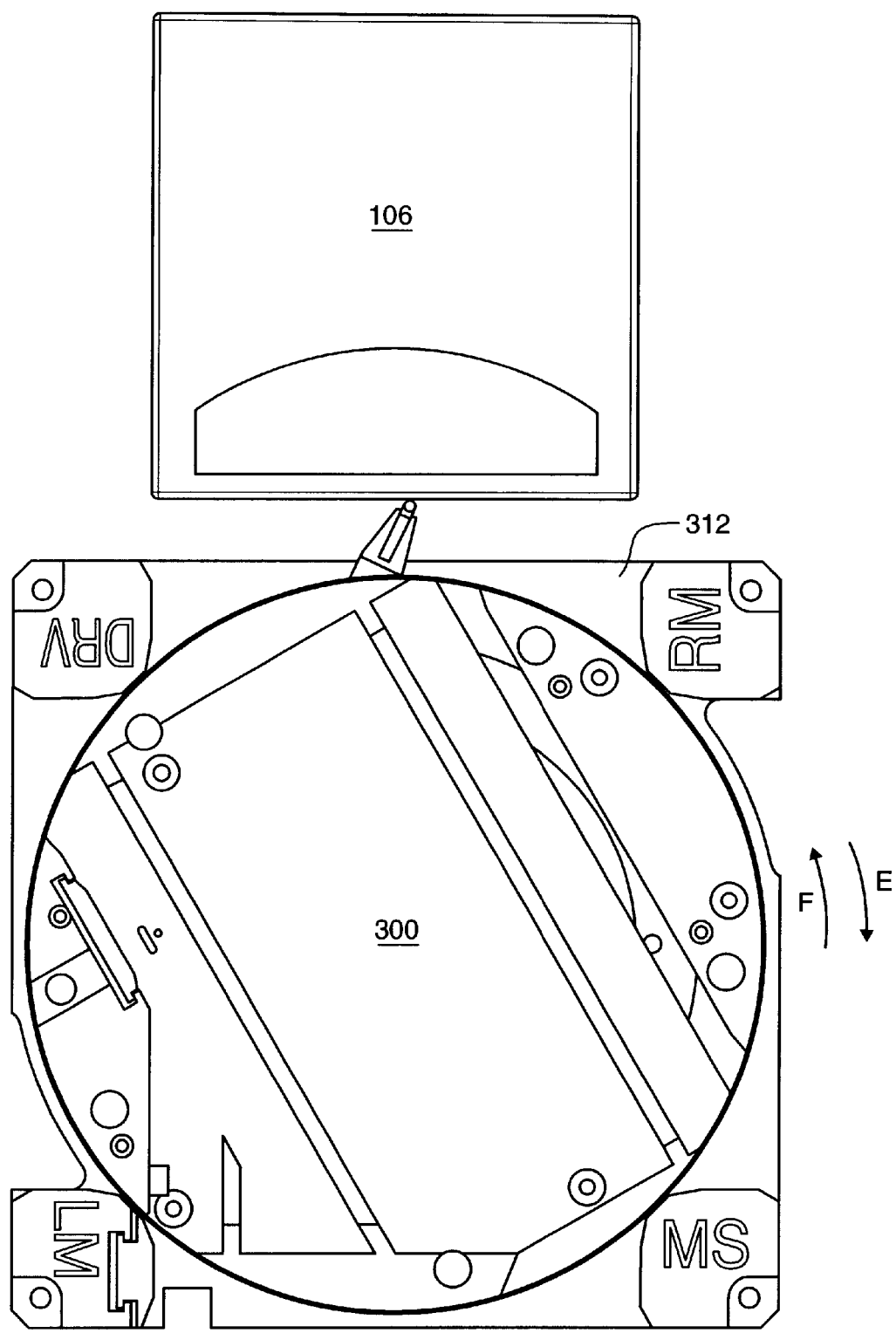
FIG. 17 is another perspective view illustrating the operation of a tape cartridge picker according to the present invention.

FIG. 9 is a flow chart illustrating the delivery of the tape cartridge 106 to the tape drive 101. On FIG. 9, the operation begins at step 900 with the tape cartridge 106 loaded onto the cartridge picker as described in FIG. 7. At step 901, the turntable 300 is rotated to align the front of the turntable 300 on-axis with the exchange port 312 and the tape drive 101. At step 902, the translation arm 302 is extended to the forward extension position to insert the tape cartridge 106 into the tape drive 101, as exemplified by the insertion shown in FIG. 15. It should be noted that although FIG. 15 shows an insertion through the exchange port 309 aligned with the magazine 103 the operation is identical for insertion through the port 312 aligned with the tape drive 101. Those skilled in the art will also appreciate that the tape cartridge 106 is only partially inserted into the tape drive 101 at this point to prevent the translation arm 302 from contacting the tape drive 101. At step 903, the turntable 300 is again rotated in the direction (E) to the three and one half degrees off-axis position to disengage the pin 303 from the cartridge notch 111, as exemplified by FIG. 14. At step 904, the translation arm 302 is retracted to the home position of FIG. 12 so that the turntable 300 is free to rotate. Alternatively, the translation arm 302 only need be retracted far enough for the picker 102 to rotate without interference from the cartridge 106. At step 905, the turntable is rotated in direction (F) so that it is aligned approximately thirty degrees off-axis with the exchange port 312, and the translation arm 302 is behind the tape cartridge 106, as shown in FIG. 17. It should be noted that the thirty-degree rotation is not essential but rather advantageously adds mechanical advantage and permits the translation arm 302 to push on the center of the cartridge 106. At step 906, the translation arm is again extended to the forward extension position to finish inserting the tape cartridge 106 into the tape drive 101. Those skilled in the art will appreciate that because of the thirty-degree off-axis alignment with the exchange port 312, the forward extension of the translation arm 302 is now able to complete the insertion of the tape cartridge 106 into the tape drive 101. The operation ends at step 907.

Figure 10:
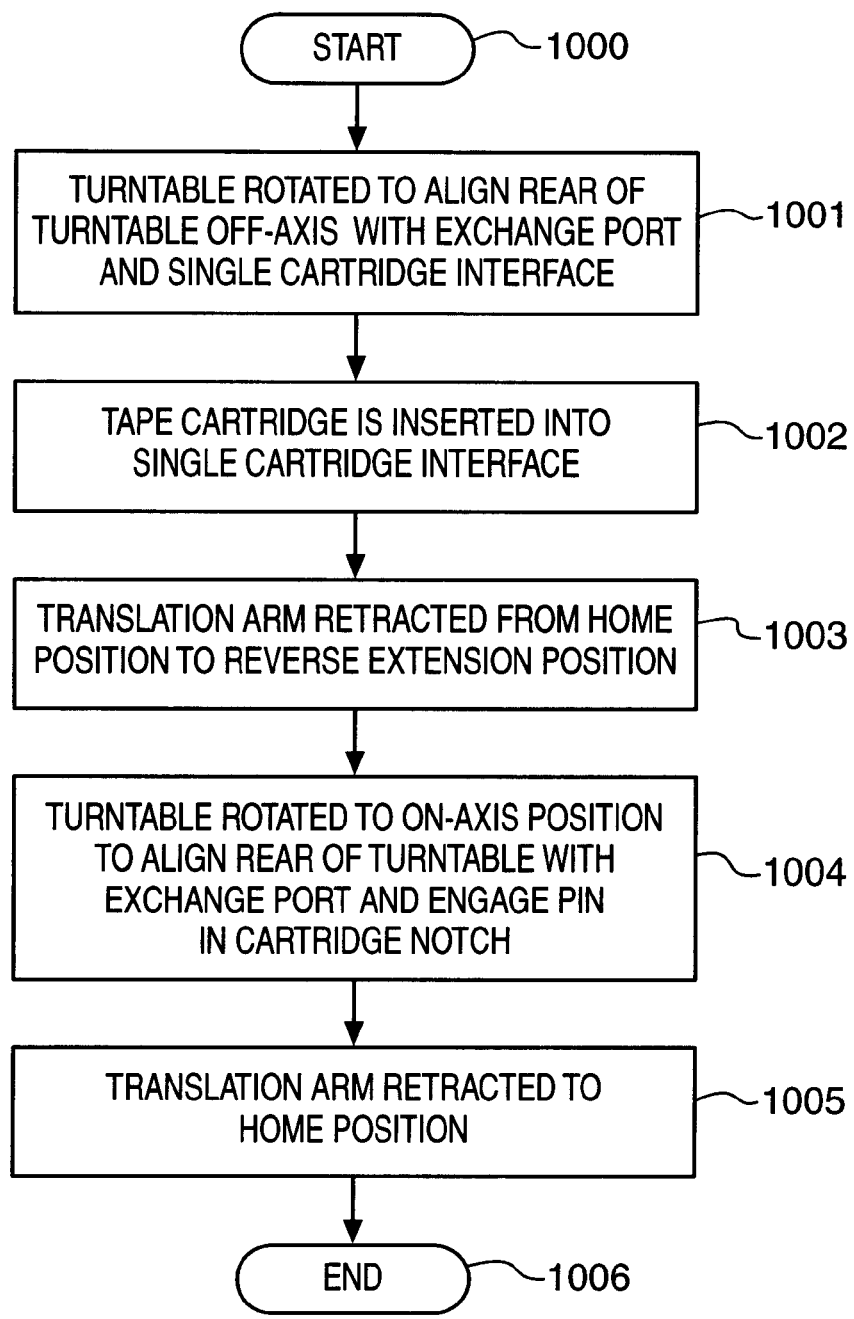
FIG. 10 is a flow chart illustrating another example of the operation of a tape cartridge picker according to the present invention.
Figure 18:
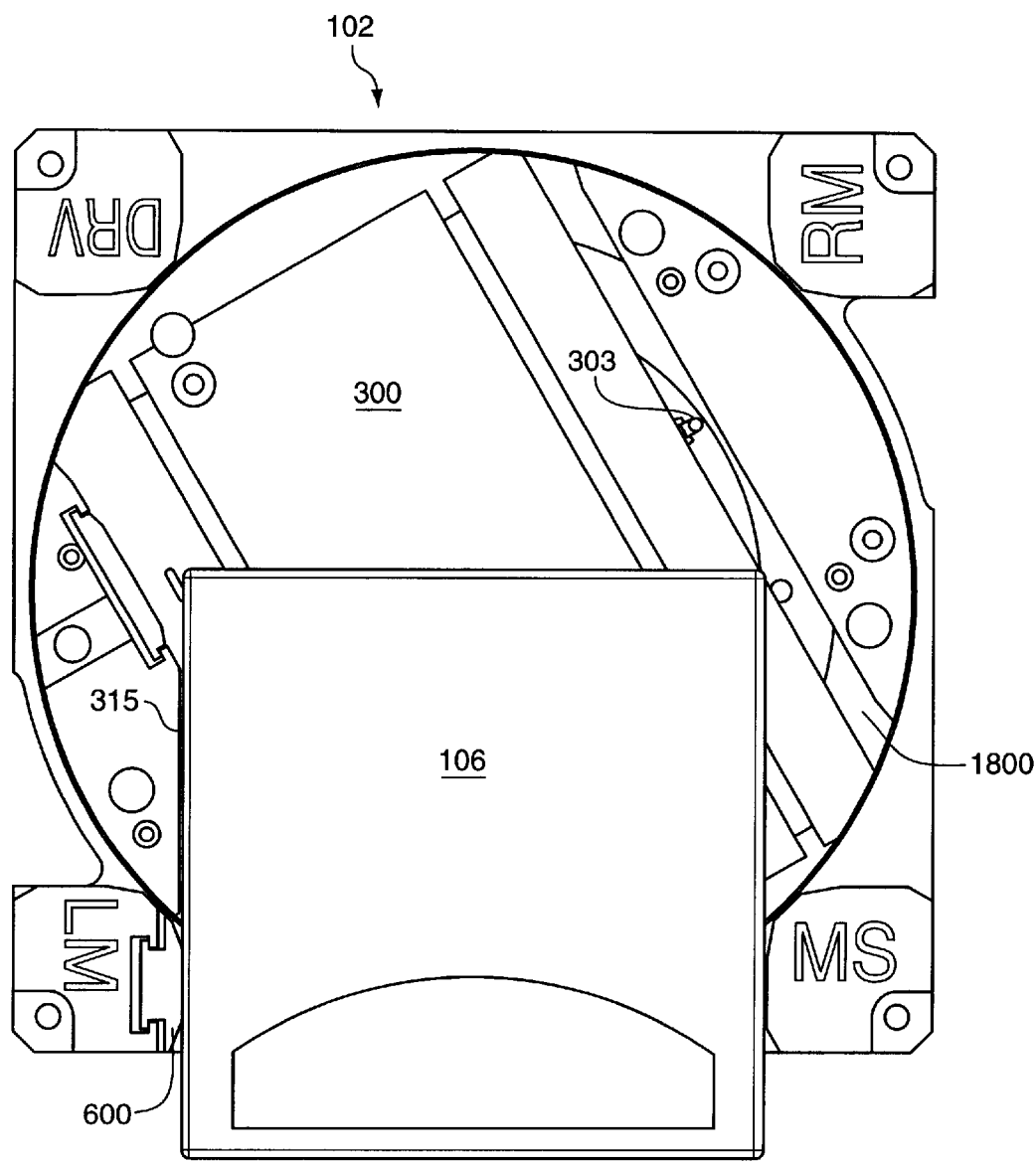
FIG. 18 is another perspective view illustrating the operation of a tape cartridge picker according to the present invention.

FIG. 10 is a flow chart illustrating the receipt of the tape cartridge 106 from the single cartridge interface 107. On FIG. 10, the operation begins at step 1000. At step 1001, the turntable 300 is rotated in direction (E) to align the rear of the turntable 300 approximately thirty-degrees off-axis with the exchange port 310 and the single cartridge interface 107, as shown in FIG. 12. It should be noted that at step 1001, the translation arm 302 is in the home position and the wall 315 is aligned with the column 306. At step 1002, an operator inserts the tape cartridge 106 into the single cartridge interface 107, as shown in FIG. 18. The flex wall 600 operates to guide the tape cartridge 106 during insertion. Specifically, the flex wall 600 prevents the tape cartridge 106 from rotating counter clockwise during insertion and running into wall 315, thus preventing jamming. As the tape cartridge 106 is inserted into the single cartridge interface 107, the key 416, on the wall 315, engages a conventional slot defined in the side of the tape cartridge 106. Advantageously, the key 416 only permits the tape cartridge 106 to be inserted into the single cartridge interface 107 in one orientation.

Figure 19:
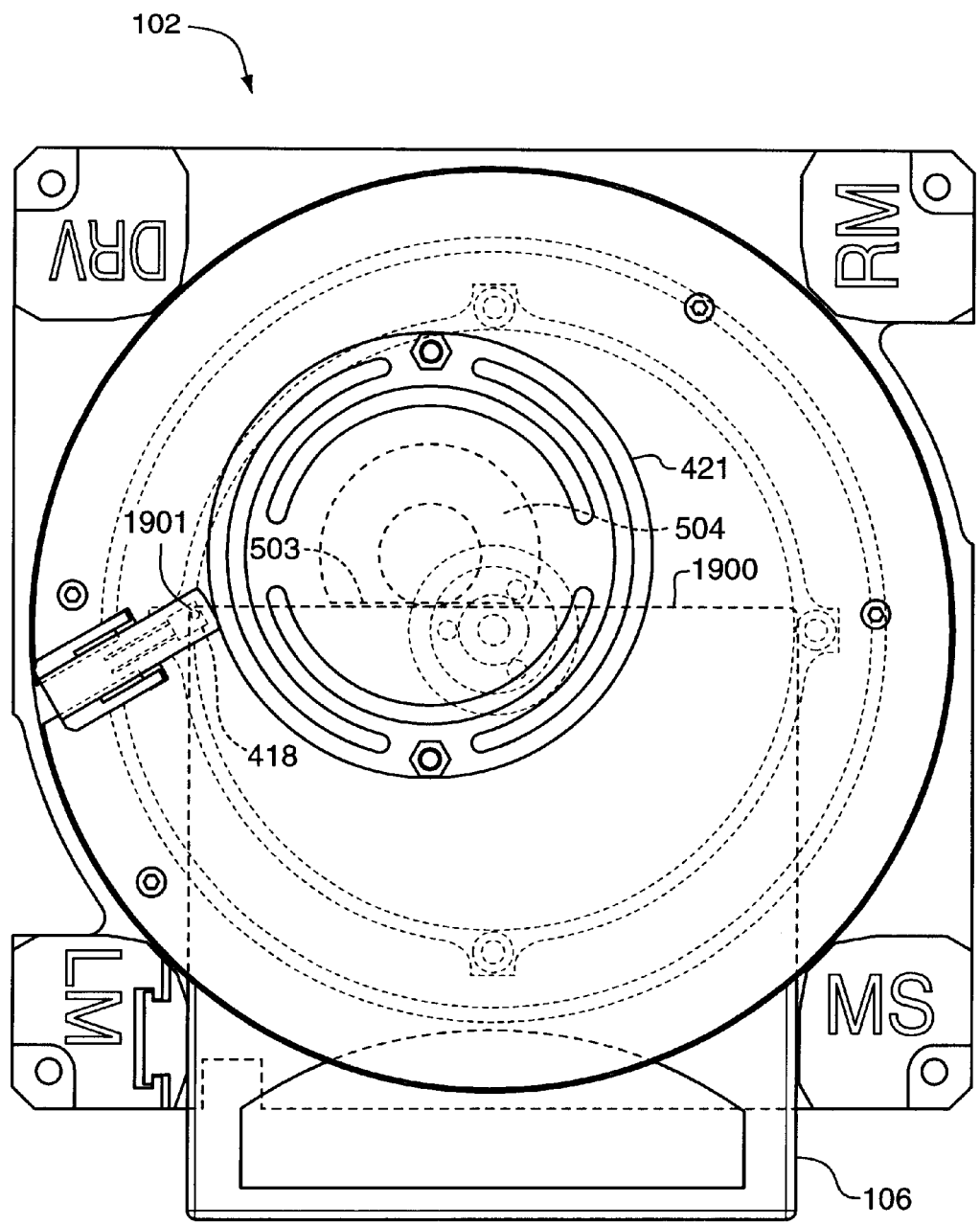
FIG. 19 is another perspective view illustrating the operation of a tape cartridge picker according to the present invention.

The cartridge stop/compression pad 421 is configured to stop the insertion of the tape cartridge 106 when the face 1900 of the tape cartridge 106 contacts the planer portion 503 of the cartridge stop/compression pad 421 as shown in FIG. 19. In the stopped position, the tape cartridge 106 is positioned so that pin 303 will align with and engage the cartridge notch 111 when the turntable 300 is rotated. Advantageously, the cartridge stop/compression pad 421 only functions to stop the tape cartridge when the turntable is in the position of FIG. 18. In all other positions, the tape cartridge 106 contacts the beveled portion 504 of the cartridge stop/compression pad 421 causing the cartridge stop/compression pad 421 to function as a compression pad and expand vertically upward to permit the cartridge to be fully received into the cavity 316. Thus, when the cartridge 106 is retrieved from the transport magazines, 103 and 104, or the tape drive 101, the cartridge picker 102 is able to suck the cartridge 106 past the cartridge stop/compression pad 421 as the compression pad portion of the cartridge stop/compression pad 421 expands vertically upward.

In the stopped position of FIG. 19, the corner 1901 of the tape cartridge 106 blocks the emitter 418 of the cartridge present sensor to indicate that a cartridge present condition. Advantageously, this permits the cartridge picker 102 to automatically sense the cartridge 106 during insertion from the single cartridge interface 107 and begin loading the cartridge 106 into the cavity 316 as described below. Alternatively, the loading could begin in response to an input received in the control panel 105 from an operator.

At step 1003, the translation arm is moved from the home position of FIG. 12 to the reverse extension position of FIG. 13. At step 1004, the turntable 300 is rotated thirty degrees in the direction (F) to the on-axis position to align the rear of the turntable 300 with the exchange port 310 and engage or seat the pin 303 in the cartridge notch 111, as shown in FIG. 20. At step 1005, the translation arm 302 is retracted to the home position of FIG. 12, to suck the tape cartridge 106 into the cavity 316 and onto the central axis of the turntable 300. The operation ends at step 1006.

Figure 11:
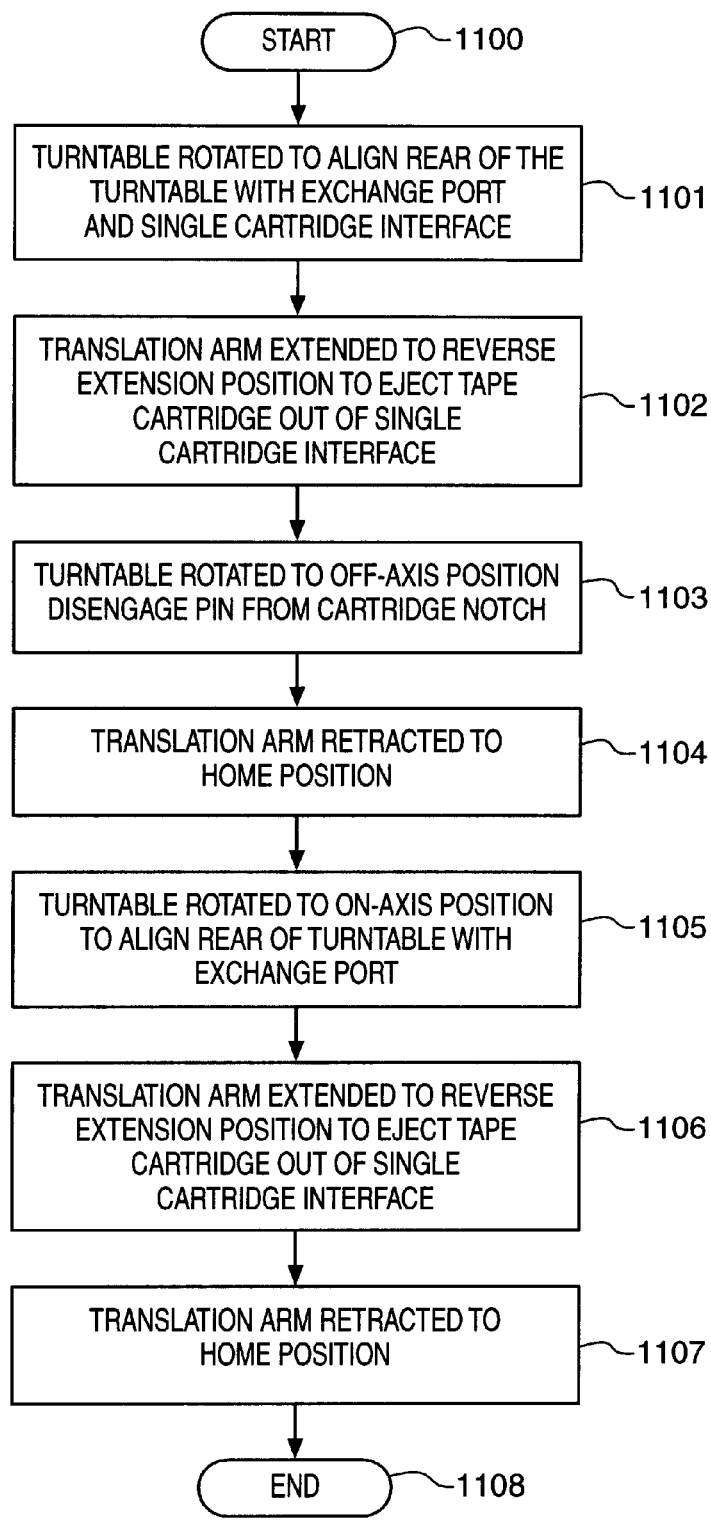
FIG. 11 is a flow chart illustrating another example of the operation of a tape cartridge picker according to the present invention.
Figure 21:
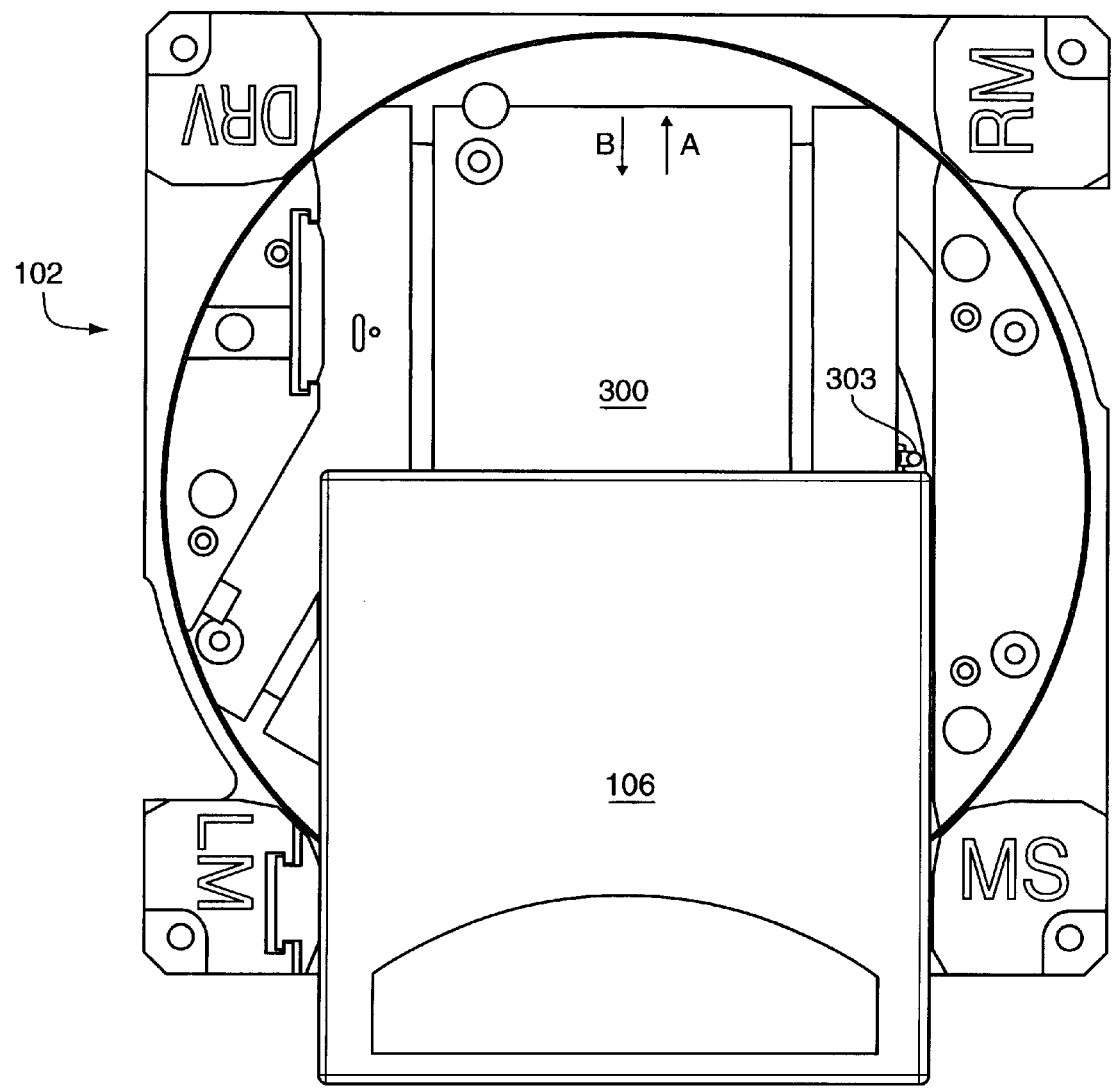
FIG. 21 is another perspective view illustrating the operation of a tape cartridge picker according to the present invention.
Figure 22:
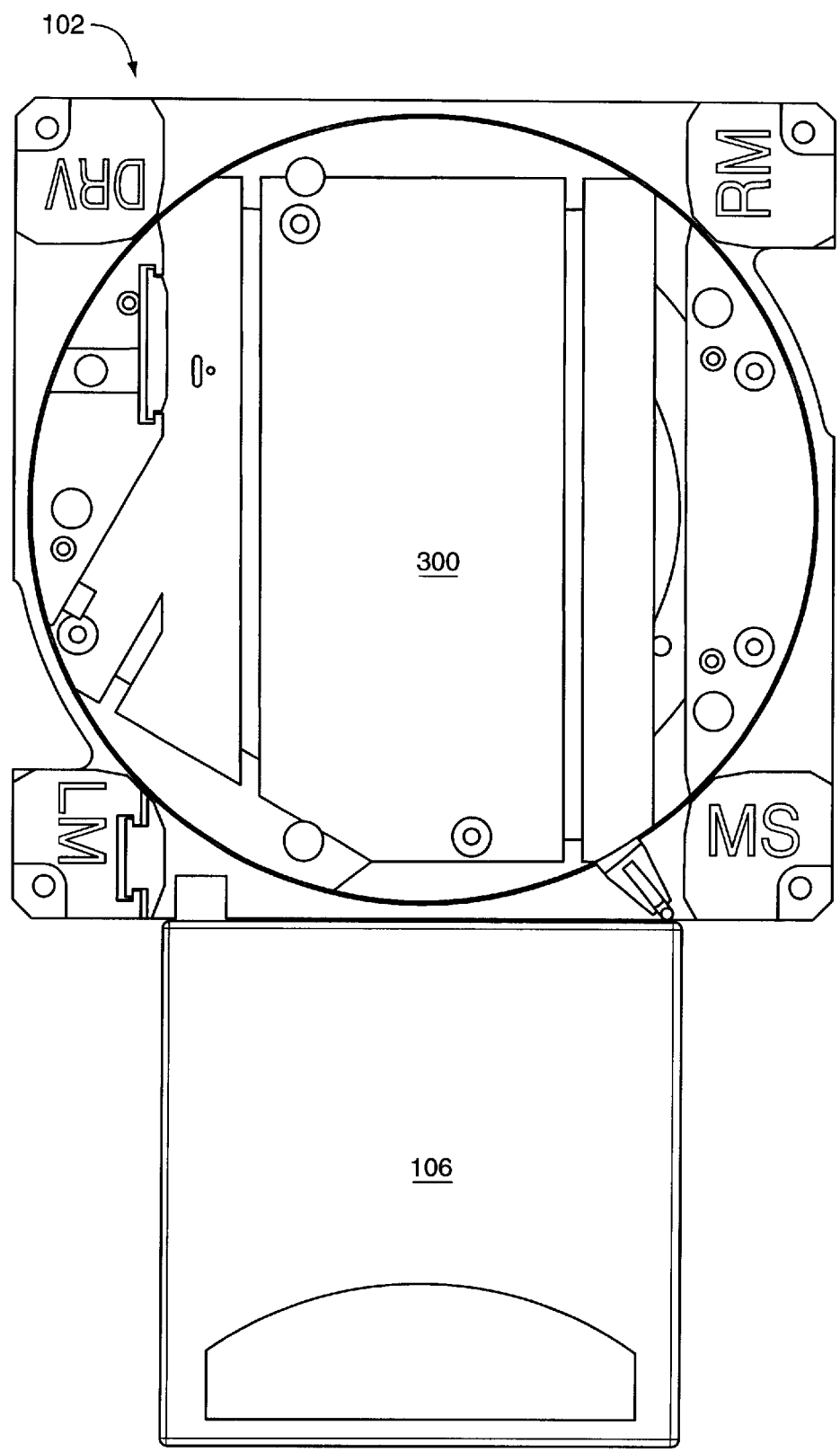
FIG. 22 is another perspective view illustrating the operation of a tape cartridge picker according to the present invention.

FIG. 11 is a flow chart illustrating the delivery of the tape cartridge 106 to the single cartridge interface 107. On FIG. 11, the operation begins at step 1100 with the tape cartridge 106 loaded onto the cartridge picker 102 as described in reference to either FIG. 7 or FIG. 10. At step 1101, the turntable 300 is rotated to align the rear of the turntable 300 on-axis with the exchange port 310 and the single cartridge interface 107. At step 1102, the translation arm 302 is extended to the reverse extension position to eject the tape cartridge 106 out of the single cartridge interface 107 as shown in FIG. 20. At step 1103, the turntable 300 is again rotated in the direction (E) to the thirty-degree off-axis position to disengage the pin 303 from the cartridge notch 111, as shown in FIG. 13. At step 1104, the translation arm 302 is retracted to a position behind the cartridge 106 as shown in FIG. 18. At step 1105, the turntable 300 is rotated in the direction (F) to the on-axis position so that the rear of the turntable is aligned with the exchange port 310 and the translation arm 302 is behind the tape cartridge 106, as shown in FIG. 21. At step 1106, the translation arm 302 is again extended to a reverse extension position to eject the tape cartridge 106 the rest of the way out of the single cartridge interface 107, as shown in FIG. 22. It should be noted that the tape cartridge 106 only needs to be ejected far enough to permit free rotation of the picker 102 for subsequent operation. Advantageously, only ejecting the cartridge 106 far enough for subsequent operation prevents the cartridge 106 from being ejected out of the single cartridge interface 107 and onto the floor. At step 1107 the translation arm is retracted to home position of FIG. 12 and the operation ends at step 1108.

Figure 23:
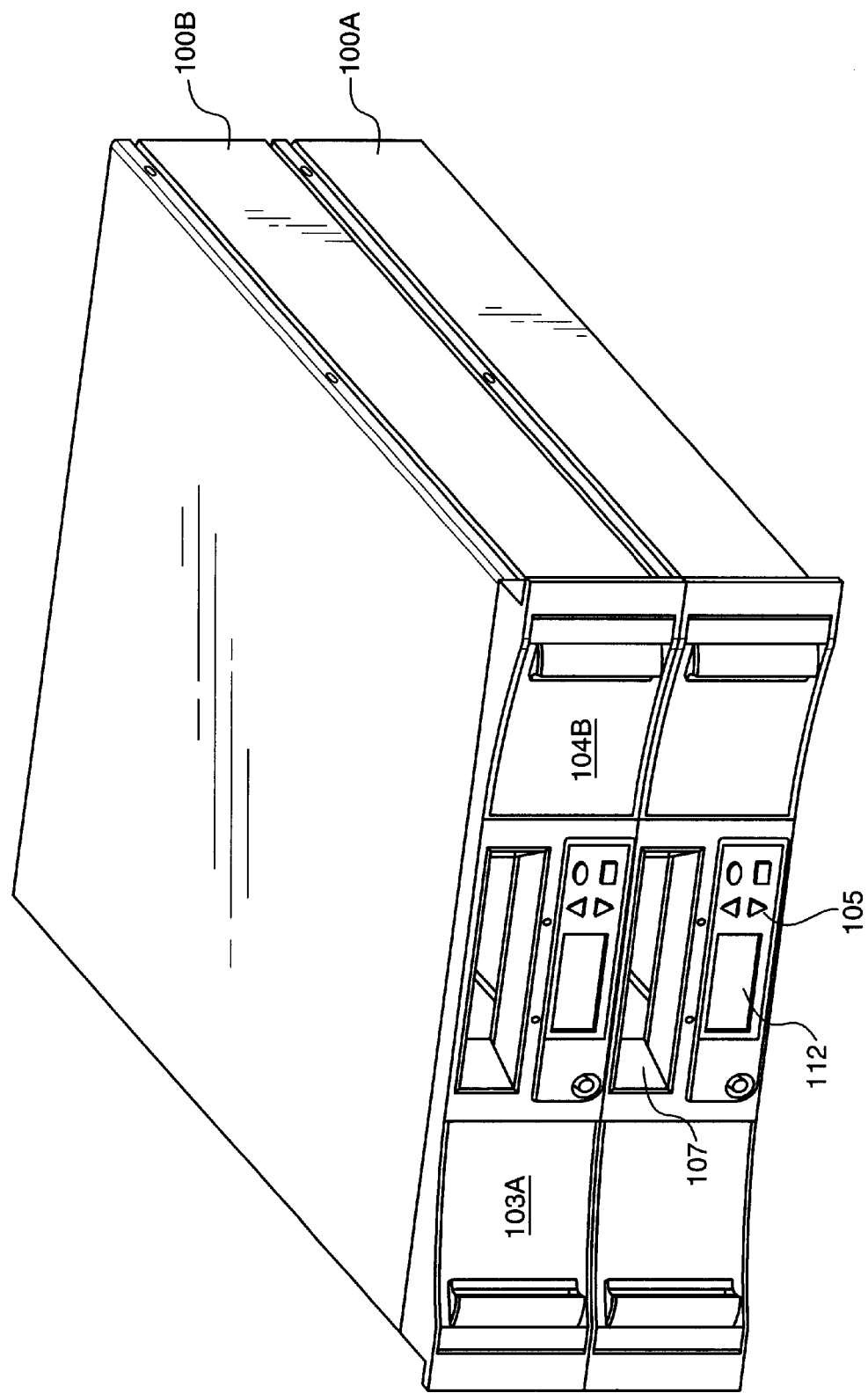
FIG. 23 illustrates a stacked configuration of the autoloader/library system configured with a tape cartridge picker according to the present invention.

Expansion of Tape Autoloader/Library Systems—FIG. 23:

FIG. 23 illustrates multiple autoloader library systems in a stacked configuration. Those skilled in the art will appreciate that an infinite number of autoloader library systems could be stacked although only library systems 100(a) and 100(b) are shown on FIG. 23 for clarity.

The autoloader/library system 100 is configured to mechanically and electrically interconnect with other substantially identical autoloader/library systems by stacking multiple autoloader/library systems to provide expandability and scalability as a matter of design choice. Once coupled, the multiple autoloader/library systems 100(a) and 100(b) can share individual tape cartridges, e.g. 106, to provide efficient load balancing and performance between the coupled autoloader/library systems. The coupled autoloader/library systems 100(a) and 100(b) could each include a cartridge picker 102, tape cartridge transport magazines, 103 and 104, a tape drive 101, and a single cartridge interface 107, or could share elements such as the cartridge picker 102, the single cartridge interface and/or the tape drive 101. Alternatively, a single cartridge picker 102 configured with an elevator mechanism could serve both autoloader/library systems 100(a) and 100(b). In addition, the coupled autoloader/library systems 100(a) and 100(b) could each include an individual control panel 105 and interface 112 or could share a single control panel, e.g. 105, and interface, e.g. 112. In the case where the library systems, e.g. 100, are coupled, the cartridge picker 102 is configured to not only rotate but is also configured to elevate within the multiple library systems, 100(a) and 100(b), to access magazines, 103(a) and 104(b).

In another example, the library systems, 100(a) and 100(b), could share the single cartridge interface 107. In this case the single cartridge interface 107 is configured with an elevator mechanism to transport the single cartridge interface 107 in the vertical direction between the multiple library systems, 100(a) and 100(b). Operationally, the cartridge picker 102 in the system 100(a) could pass tape cartridges to the single cartridge interface 107. The single cartridge interface 107 then elevates to the system 100(b) where the tape cartridge is automatically passed to a cartridge picker, e.g. 100, in the system 100(b). The cartridge picker in the system 100(b) could then exchange the tape cartridge with the tape drive, e.g. 101 or the magazines, 103(a) and 103(b), in the system 100(b). Cartridges could also be passed from the system 100(b) to the system 100(a) in a similar manner. Thus, the autoloader/library system 100 is customizable to a variety of applications with the capability of expansion at any time to provide both increased capacity and/or increased performance.

The above-described processing systems could be comprised of instructions that are stored on storage media. The instructions can be retrieved and executed by a processor. Some examples of instructions are software, program code, and firmware. Some examples of storage media are memory devices, tape, disks, integrated circuits, and servers. The instructions are operational when executed by the processor to direct the processor to operate in accord with the invention. The term "processor" refers to a single processing device or a group of inter-operational processing devices. Some examples of processors are integrated circuits and logic circuitry. Those skilled in the art are familiar with instructions, processors, and storage media.

Those skilled in the art can appreciate variations of the above-described embodiments that fall within the scope of the invention. As a result, the invention is not limited to the specific embodiments discussed above, but only by the following claims and their equivalents.

What is claimed is:

1. A tape cartridge picker for an automated tape cartridge autoloader/library system, the tape cartridge picker comprising:

a turntable configured to rotate about a central axis of rotation;

a cavity configured to receive a tape cartridge, the cavity being defined in the turntable and located substantially about the central axis of rotation; and means for loading a tape cartridge into the cavity, wherein once loaded, the tape cartridge is positioned in the cavity on the turntable about to central axis of rotation, wherein the means for loading is configured to translate to an extended position, wherein the turntable is configured to rotate to engage the means for loading with the tape cartridge when the means for loading is in the extended position, and wherein the means for is configured to translate to a retracted position when the means for loading is engaged with the tape cartridge to load the tape cartridge in the cavity on the turntable.

2. The picker of claim 1 further comprising:
means for unloading the tape cartridge from the cavity.

3. The picker of claim 2 wherein the loading means and the unloading means comprise:
a translation arm; and
a pin integrally formed and perpendicularly orientated to the translation arm.

4. The picker of claim 3, wherein the translation arm is configured to extend from the turntable to align the pin with a corresponding feature in the tape cartridge, and wherein the turntable is configured to rotate to engage the pin with the corresponding feature when the translation arm is extended from the turntable.

5. The picker of claim 4, wherein the translation arm is configured to retract to load the tape cartridge into the cavity when the pin is engaged with the corresponding feature in the tape cartridge.

6. The picker of claim 5, wherein the translation arm is configured to extend from the turntable with the pin engaged with the corresponding feature in the tape cartridge to unload the tape cartridge from the cavity, and wherein the turntable is configured to rotate to disengage the pin from the corresponding feature in the tape cartridge when the translation arm is extended from the turntable.

7. The picker of claim 1 further comprising:
a stationary picker base, wherein the turntable rotates about the central axis of rotation within the stationary picker base.

8. The picker of claim 1 further comprising:
a bar code reader configured to read computer readable indicia on the tape cartridge.

9. The picker of claim 1 further comprising:
means for rejecting tape cartridges improperly presented to the cartridge picker.

10. The picker of claim 9 wherein the means for rejecting comprises:
a key integrally formed in a wall of the cavity and configured to align with a groove on the tape cartridge when the tape cartridge is properly presented to the cartridge picker.

11. A method for operating a tape cartridge picker for an automated tape cartridge autoloader library system, the method comprising:
extending a translation arm to align a pin on the translation arm with a corresponding feature in a tape cartridge;
rotating the turntable to engage the pin in the corresponding feature;
retracting the translation arm when the pin is engaged in the corresponding feature; and
receiving the tape cartridge onto the turntable so that the tape cartridge is positioned on the turntable substantially on a central axis of rotation for the turntable.

12. The method of claim 11, wherein the tape cartridge is received when the turntable is rotated to a first position.

13. The method of claim 12, further comprising:
rotating the turntable to a second position; and
unloading the tape cartridge from the turntable when the turntable is in the second position.

14. The method of claim 13, wherein unloading the tape cartridge comprises:
extending the translation arm with the pin engaged in the corresponding feature in the tape cartridge;
rotating the turntable to disengage the pin from the corresponding feature when the translation arm is extended; and
retracting the translation arm when the pin is disengaged from the corresponding feature.

15. The method of claim 14, wherein the turntable is rotated to an off-axis position relative to the second position to disengage the pin from the corresponding feature, and wherein the turntable is rotated to an off-axis position relative to the first position when the translation arm is extended to align the pin with the corresponding feature in the tape cartridge.

16. The method of claim 11, wherein the turntable rotates on a stationary base.

17. The method of claim 16, wherein the stationary base includes a plurality of cartridge exchange ports, and wherein the turntable rotates to exchange tape cartridges between the plurality of cartridge exchange ports.

18. The method of claim 17, wherein the turntable includes a central cavity having an open end to receive the tape cartridge, and further comprising:
rotating the turntable to an off-axis position with the open end of the central cavity misaligned with a first cartridge exchange port;
extending the translation arm to align the pin with the corresponding feature in the tape cartridge when the turntable is rotated to the off-axis position;
rotating the turntable to an on-axis position with the open end of the central cavity aligned with the first cartridge exchange port to engage the pin with the corresponding feature;
retracting the translation arm to receive the tape cartridge into the central cavity;
rotating the turntable to an on-axis position with the open end of the central cavity aligned with a second cartridge exchange port when the tape cartridge is received in the central cavity;
extending the translation arm to unload the tape cartridge from the central cavity when the turntable is rotated to the on-axis position;
rotating the turntable to disengage the pin from the corresponding feature; and
retracting the translation arm.

19. The method of claim 11, further comprising:
reading a computer readable indicia on the tape cartridge when the tape cartridge is received.

20. The method of clam 11, further comprising:
detecting the presence of the tape cartridge when the tape cartridge is received.

21. A tape cartridge picker comprising:
a stationary base;
a turntable rotatably connected to the stationary base, wherein the turntable is configured to rotate about a central axis of rotation on the stationary base, and wherein the turntable includes a central cavity configured to receive a tape cartridge;
a translation arm slidably attached to the turntable; and
a pin disposed at one end of the translation arm,
wherein the translation arm is configured to translate between a retracted position and an extended position, and wherein the turntable is configured to rotate to engage the pin in a notch in the tape cartridge when the translation arm is in the extended position.

22. The tape cartridge picker of claim 21, wherein the central cavity is defined by:
a first wall;
a second wall opposite and parallel to a portion of the first wall, wherein a first end of the first wall and a first end of the second wall define a first opening into the central cavity; and a third wall opposite and at an angle to a portion of the first wall, wherein a first end of the third wall abuts the second end of the second wall, and wherein a second end of the third wall and a second end of the first wall define a second opening into the central cavity.

23. The tape cartridge picker of claim 22, further comprising:
a flex wall disposed in the second wall, wherein the flex wall is configured to bias the tape cartridge against the first wall when the tape cartridge is received in the central cavity to prevent the pin from disengaging from the notch in the tape cartridge.

24. The tape cartridge picker of claim 22, further comprising:
a key disposed in the third wall to mate with a corresponding groove in a side of the tape cartridge to prevent mis-insertion of the tape cartridge.

25. The tape cartridge picker of claim 21, wherein the stationary base includes a plurality of columns that define a plurality of cartridge exchange ports, and wherein the turntable is configured to rotate to exchange a tape cartridge between the plurality of cartridge exchange parts.

26. The tape cartridge picker of claim 25, wherein each of the plurality of columns includes an undercut portion to allow the translation arm to rotate without contacting the plurality of columns.

27. The tape cartridge picker of claim 25, wherein the central cavity includes an open end to receive the tape cartridge, and wherein the tape cartridge picker is configured to perform the following operations to load the tape cartridge from a first one of the cartridge exchange ports and unload the tape cartridge to a second one of the cartridge exchange ports:
rotate the turntable to an off-axis position with the open end of the central cavity misaligned with the first cartridge exchange port;
extend the translation arm to align the pin with the notch in the tape cartridge when the turntable is rotated to the off-axis position;
rotate the timetable to an on-axis position with the open end of the central cavity aligned with the first cartridge exchange port to engage the pin with the notch;
retract the translation arm to receive the tape cartridge into the central cavity;
rotate the turntable to an on-axis position with the open end of the central cavity aligned with the second cartridge exchange port when the tape cartridge is received in the central cavity;
extend the translation arm to unload the tape cartridge from the central cavity when the turntable is rotated to the on-axis position;
rotate the turntable to disengage the pin from the notch; and
retract the translation arm.

28. The tape cartridge picker of claim 21, further comprising:
a bar code reader to read a computer readable indicia on the tape cartridge.

29. The tape cartridge picker of claim 21, further comprising:
a first motor configured to rotate the turntable; and
a second motor configured to translate the translation arm.

30. The tape cartridge picker of claim 29, further comprising.
a spur gear coupled to the first motor;
a ring gear mounted or formed in the stationary base, wherein the ring gear is coupled to the spur gear and to the turntable.

31. The tape cartridge picker of claim 29, further comprising:
a lead screw connected to the translation motor and the translation arm to extend and retract the translation arm.

32. The tape cartridge pick of claim 31, further comprising:
a belt connected to the lead screw and the translation motor.

33. The tape cartridge picker of claim 31, wherein the translation arm further comprises:
a roller configured to be driven by the lead screw; and
a second roller configured to ride in a channel formed in the turntable.

34. The tape cartridge picker of claim 33, wherein the channel formed in the turntable extends adjacent to a first edge of the turntable to a second edge of the turntable opposite the first edge to guide the translation arm from a first position with the pin adjacent to the first edge of the turntable to a second position with the pin adjacent to the second edge of the turntable.

35. The tape cartridge picker of claim 21, further comprising:
a cartridge present sensor configured to detect the presence of the tape cartridge in the central cavity.

36. The tape cartridge picker of claim 35, wherein the cartridge present sensor comprises:
an emitter portion; and
a detector portion.

* * * * *

UNITED STATES PATENT AND TRADEMARK OFFICE
CERTIFICATE OF CORRECTION

PATENT NO. : 6,816,331 B2
DATED : November 9, 2004
INVENTOR(S) : Ryan S. Porter et al.

It is certified that error appears in the above-identified patent and that said Letters Patent is hereby corrected as shown below:

Column 2,
Line 49, please replace "coplanar components to is achieve" with -- coplanar components to achieve --

Column 12,
Line 11, please replace "about to central axis"with -- about the central axis --
Lien 16, please replace "the means for is configured" with -- the means for loading is configured --

Column 13,
Line 3, please replace "on the tape cartridge." with -- on the tape cartridge(s). --

Column 15,
Line 5, please replace "cartridge exchange parts" with -- cartridge exchange ports --
Line 14, please replace "rotate the timetable" with -- rotate the turntable --

Column 16,
Line 1, please replace "tape cartridge pick" with -- tape cartridge picker --
Line 3, please replace "a roller configured" with -- a first roller configured --

Signed and Sealed this

Nineteenth Day of April, 2005

JON W. DUDAS
*Director of the United States Patent and Trademark Office*